(12) United States Patent
Walker et al.

(10) Patent No.: US 7,483,670 B2
(45) Date of Patent: *Jan. 27, 2009

(54) METHOD AND APPARATUS FOR EDUCATIONAL TESTING

(75) Inventors: Jay S. Walker, Ridgefield, CT (US); Bruce Schneier, Minneapolis, MN (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 838 days.

This patent is subject to a terminal disclaimer.

(21) Appl. No.: 10/242,490

(22) Filed: Sep. 12, 2002

(65) Prior Publication Data

US 2003/0087223 A1 May 8, 2003

Related U.S. Application Data

(63) Continuation-in-part of application No. 09/350,833, filed on Jul. 9, 1999, now abandoned, which is a continuation of application No. 08/647,301, filed on May 9, 1996, now Pat. No. 5,947,747.

(51) Int. Cl.
*G09B 7/00* (2006.01)
*G06F 17/30* (2006.01)

(52) U.S. Cl. .................. 434/354; 707/10; 707/104.1

(58) Field of Classification Search .......... 707/5, 707/10, 104.1, 6, 100, 1, 102; 434/322, 354, 434/118, 327, 344, 32, 353; 706/927; 709/203, 709/201; 715/700, 526, 764, 780, 781, 234

See application file for complete search history.

(56) References Cited

U.S. PATENT DOCUMENTS

| | | | |
|---|---|---|---|
| 4,658,093 A | 4/1987 | Hellman | |
| 4,967,354 A | 10/1990 | Buchanan | |
| 4,978,305 A | 12/1990 | Kraft | |
| 5,036,461 A | 7/1991 | Elliott et al. | |
| 5,050,212 A | 9/1991 | Dyson | |
| 5,059,127 A * | 10/1991 | Lewis et al. ................ | 434/353 |
| 5,083,271 A | 1/1992 | Thacher et al. | |
| 5,112,051 A | 5/1992 | Darling et al. | |
| 5,155,680 A | 10/1992 | Wiedemer | |
| 5,193,114 A | 3/1993 | Moseley | |
| 5,243,652 A | 9/1993 | Teare et al. | |
| 5,243,654 A | 9/1993 | Hunter | |
| 5,259,029 A | 11/1993 | Duncan, Jr. | |
| 5,259,766 A * | 11/1993 | Sack et al. ................. | 434/362 |
| 5,288,978 A | 2/1994 | Iijima | |

(Continued)

OTHER PUBLICATIONS

Website: "NCS MicroTest Score II Plus", National Computer Systems, Inc., (http //www ncsinternational com/ncscorp/education/m-test2 htm), Copyright 1997.

(Continued)

*Primary Examiner*—Greta L Robinson

(57) ABSTRACT

Methods and apparatuses are disclosed for computer-based evaluation of a test-taker's performance with respect to a reward threshold. A performance assessment of the test taker can be standardized or customized, as well as relative or absolute. The system allows a parentally-controlled reward system such that children who reach specified objectives can claim an award that parents are confident was fairly and honestly earned without the parent being required to proctor the testing.

47 Claims, 19 Drawing Sheets

U.S. PATENT DOCUMENTS

| | | | |
|---|---|---|---|
| 5,319,710 | A | 6/1994 | Atalla et al. |
| 5,321,611 | A | 6/1994 | Clark et al. |
| 5,347,580 | A | 9/1994 | Molva et al. |
| 5,349,642 | A | 9/1994 | Kingdon |
| 5,351,293 | A | 9/1994 | Michener et al. |
| 5,355,413 | A | 10/1994 | Ohno |
| 5,359,510 | A | 10/1994 | Sabaliauskas |
| 5,377,268 | A | 12/1994 | Hunter |
| 5,386,468 | A | 1/1995 | Akiyama et al. |
| 5,400,319 | A | 3/1995 | Fite et al. |
| 5,412,575 | A | 5/1995 | Constant et al. |
| 5,416,840 | A | 5/1995 | Cane et al. |
| 5,434,918 | A | 7/1995 | Kung et al. |
| 5,513,994 | A | 5/1996 | Kershaw et al. |
| 5,565,316 | A | 10/1996 | Kershaw et al. |
| 5,615,359 | A * | 3/1997 | Yung .......................... 707/10 |
| 5,718,591 | A * | 2/1998 | Clark et al. ................... 434/322 |
| 5,752,836 | A * | 5/1998 | Clark et al. ................... 434/322 |
| 5,768,382 | A | 6/1998 | Schneier et al. |
| 5,820,386 | A * | 10/1998 | Sheppard, II ............... 434/322 |
| 5,827,070 | A * | 10/1998 | Kershaw et al. ............. 434/322 |
| 5,904,485 | A * | 5/1999 | Siefert ......................... 434/322 |
| 5,947,747 | A * | 9/1999 | Walker et al. ................ 434/354 |
| 5,970,143 | A | 10/1999 | Schneier et al. |

OTHER PUBLICATIONS

Website: "Test Scoring/Optical Scanning", University of Maryland Academic Information Services, (http //www aits umd edu/faculty_staff/test html), download date: Jul. 28, 1998.

Website: "Test Scoring Results Available Through Email", (http //www uww edu/STIR/apr96/5Test htm), download date: Jul. 28, 1998.

* cited by examiner

SCORE CODE
NUMBER RIGHT
NUMBER WRONG
WHICH QUESTIONS WERE MISSED
WHICH QUESTIONS WERE ANSWERED FASTEST
WHICH QUESTIONS WERE ANSWERED SLOWEST
SOFTWARE ID
DEVICE ID
ENCODED REPRESENTATION OF PART OR ALL OF THE ABOVE

PERFORMANCE INDICATION
DEVICE ID
SOFTWARE ID
BASIC COMPARISON STATISTICS
CONTROL MESSAGES:
    -ALTER TEST SOFTWARE
        --DIRECT QUESTIONS TO AREAS OF WEAKNESS
        --ALLOW LESS TIME FOR ANSWERS
    -UNLOCK DISPLAY OF REWARDS
THRESHOLD ATTAINMENT FOR REWARDS

METHOD AND APPARATUS FOR EDUCATIONAL TESTING

The present application is a Continuation-In-Part of U.S. patent application Ser. No. 09/350,833, filed on Jul. 9, 1999 now abandoned and entitled "METHOD AND APPARATUS FOR COMPUTER-BASED EDUCATIONAL TESTING", which is a continuation of U.S. patent application Ser. No. 08/647,301, filed on May 9, 1996 and entitled "METHOD AND APPARATUS FOR COMPUTER-BASED EDUCATIONAL TESTING", which issued as U.S. Pat. No. 5,947,747 on Sep. 7, 1999.

The entirety of each of the above applications is incorporated by reference herein as part of the present disclosure.

BACKGROUND OF THE INVENTION

The present invention relates generally to methods and apparatuses for computer-based education.

Educational software that tests a user's knowledge, coupled with the immediate scoring of answers, is well known in the art. For home use, a wide range of software is directed to various age groups including school-grade children. Thus, many educational programs are designed to be quite entertaining, with built-in tests being played as games having an underlying educational purpose. Thus, terms such as "student", "player", or "test-taker," shall be understood to mean any participant in, or user of, educational software that tests the user's knowledge in a formal or informal manner.

Software which blends both fun and learning is often referred to as "edutainment" software. Some edutainment programs include "Mathblaster", "Where in the World is Carmen Sandiego," and "Word Munchers." These edutainment programs (as well as certain other educational programs generally) present players with a series of increasingly difficult tests or puzzles, wherein players must correctly solve the present round before they are allowed to continue to the next round of play.

In the above-mentioned edutainment software, each player exists in isolation from all other players. This arrangement is reasonably well suited to informal, isolated learning, but lacks the comprehensive data collection/comparison features needed for formal test administration.

Another drawback of the existing home education software is that standardized entertainment elements often become repetitive and boring after seeing them for the third or fourth time. Users often stop using the software once the novelty has worn off.

BRIEF DESCRIPTION OF THE DRAWINGS

FIGS. 11(a) and 11(b) illustrate exemplary content of (a) the score code and (b) the performance indication, respectively.

DETAILED DESCRIPTION OF THE INVENTION

Figure 1:
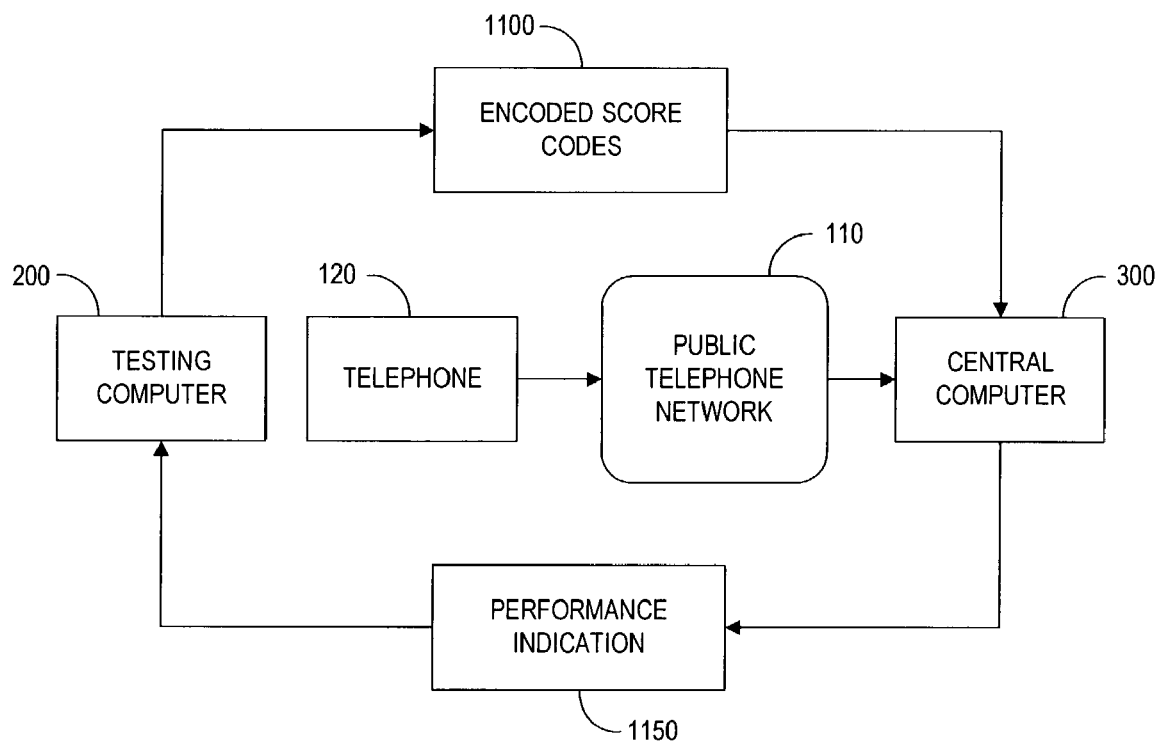
FIG. 1 illustrates the basic components of a system for computer-based educational testing.

Methods and apparatuses are disclosed for computer-based evaluation of a student's performance, and for computer-based evaluation of a student's performance with respect to selected comparative norms. An embodiment includes a home testing computer for transmitting the student's test results to a central computer, which in turn derives a performance assessment of the test-taker. The performance assessment can be standardized or customized, and can be relative to something else or absolute. Further, the transmitted test results may be configured to reliably associate the student with his test results (e.g., using encoding and/or other user identification techniques) in order to deter fraud. Thus, for example, the system can allow a parentally-controlled reward system such that children who reach specified objectives can claim an award that parents are confident was earned fairly and honestly, without the parent being required to supervise the game play. Fraud, and the need for proctoring, is also deterred during multiple student testing via an option for "simultaneous testing" of geographically dispersed test-takers.

It would be useful for a user of educational software to compare his test score with other users' scores. Such inter-player comparisons include, e.g., comparing accuracy of answers and comparing speed of answers. Comparisons could be calculated for any given test as a whole, for groups of related questions or for individual questions. For example, is a score of 2,350 in Mathblaster a good score for a ten year old? How did all fifth graders do on level 4 of the multiplication section? Or, in "Where in the World is Carmen Sandiego," is a student at the sixth grade level for naming U.S. state capitols but only at a third grade level at naming foreign countries? How do these scores vary by school district, state, or perhaps even for children in the same school or class?

In an embodiment of the invention, testing software is incorporated into "edutainment" games for reporting a player's overall score, along with other subcategories of information (e.g., subject areas within the test material, time taken to answer questions, etc.), as a numeric test result (e.g., 2340-9908-0011) or "score code." The test result may also include information as to whether or not the software had been altered during the testing procedure. To prevent alteration during the transmission process, the score is scrambled to prevent unauthorized access thereto. For even greater security, the system could use a variety of cryptographic protocols to make it difficult to forge and to prevent the user from misrepresenting his result to a database located at the central computer.

Whenever a player finishes a game for which the score is good enough to justify "registering," the player could use a touch-tone phone to call an 800 number to reach a central computer and register his score with an interactive voice response unit. Such registration may be mandatory or optional. For example, the software may require registration after a certain number of games by denying access until a confirmation code was entered.

If a player was calling for the first time, a live operator might register the player into a database containing important comparative factors such as age, grade, school, address, parent's name, password, etc. This "setup" phase could also be accomplished by mail.

For subsequent call-ins, the score registration process would be automated. An interactive system would prompt the player step-by-step through the registration process, beginning with the player entering his personal ID number and then his score code. The central computer would decrypt the score code and save the decrypted information in the central database for comparative evaluation against an appropriate test benchmark. Such benchmark would typically be performed according to demographic or geographic norms determined by the test-taker's registration information. The test benchmark could even include the user's own past test results. After making the appropriate comparisons, it would generate a customized "performance indication" to be given to the player.

The performance indication could also include a confirmation code to be entered into the test-taker's computer as evidence that he had registered his test results. Prior to acceptance, the testing computer could check the confirmation code to make sure it was valid. Based on the performance indication and/or confirmation code, the software could adjust future interactions with the test-taker based on his past performance. This "reflexive" feature would be based on how comparable children answered the same questions, as opposed to being preprogrammed at the time of manufacture or distribution of the software. For example, if a child is performing significantly below his peers in a particular category, the reflexive feature of the software could direct the software to focus future test questions in that category.

In addition, the player's comparative results and statistics could be logged to a special review section of the testing program. Access to these statistics could be restricted by a password held only by the child's parent. Optionally, a detailed report could be generated by the central computer and mailed to the parent, allowing the parent to carefully review his child's comparative scores. This report could also contain specialized exercises and remedial program recommendations based on the child's results.

For the case of a class of students taking computerized tests at home, each test could be composed of different questions selected, in part, based on past performance. The questions could also be randomized, either in order or content, to deter cheating. Once finished, a test-taker would call an 800 number to register his score code, which could include the serial number of the testing software and/or student ID. Thus one student could not give his score code to a second student to falsely suggest that the second student had taken the test. To further deter fraud, the testing computers could be configured for simultaneous testing based on receipt of a starting authorization.

It was mentioned previously that the returned performance indication would provide statistical information and/or future test customization to an end user, such as a parent or teacher. The same performance indication could also include a reward attainment message for certifying the test-taker's achievement of a reward threshold, which had been previously registered by a parent, teacher, or other end user at the central computer. The end user could subsequently interrogate the testing computer (or even the central computer itself) to determine if the test-taker had been issued the reward attainment message and to provide a reward in accordance therewith.

In the above embodiment, the testing software is located on the testing computer, and answers to pre-programmed questions are scored locally before the test-taker manually transmits the results to the central computer using a voice-based telephonic data input device. Alternatively, the testing computer could connect to the central computer and transmit the score code via an on-line (e.g., Internet, World Wide Web, America Online, etc.) connection. Indeed, the testing computer could even receive the test questions directly from the central computer rather than pre-storing them locally. This would allow the test administrator great flexibility in modifying and controlling test question distribution and access. The order or content of subsequent test questions could also be interactively customized for the needs of the individual test-taker in accordance with his ongoing or historical performance. Finally, instead of grading the test and transmitting the test score, the testing computer could transmit ungraded test answers, for grading and performance evaluation at the central computer.

Using embodiments of the present invention, remotely-located test-takers can compare their results with other remotely located test-takers. Comparisons can be done on an ongoing basis with no need for an on-line connection, and scoring can be done locally with no need to send all answers to a centralized scoring authority. Alternatively, an on-line connection could be used for even greater flexibility in test question distribution and control.

Whether on-line or off-line, the test-taker's score is securely associated with the test-taker's identity, which deters cheating as well as allowing the test results to be certified to a party (e.g., a parent) that did not necessarily witness the test-taking. The parent would not need to monitor the results since they cannot be falsely registered. The parent could even establish his own local criteria for evaluating his child's performance, with the monitoring and evaluation to be performed automatically by the same central computer that certifies the test results. The returned performance indication could also include commands to the testing software to customize future functionality based on past performance. In this sense, the educational software is not only for testing, but may additionally or alternatively be used for tutoring or workbook purposes.

Similarly, teachers can get reports on how their students compare in a wide variety of dimensions vs. other comparable students, and the students can be provided with specific remedial direction. Also, since each test-taker is uniquely associated with his test results, a teacher can administer a test to a class of students at home without fear that the students could give each other a valid code to simulate having taken the test as a whole. Another type of cheating involves students getting specific answers to specific questions from earlier test-takers during staggered testing in the absence of reliable monitoring. In that case, a central phone system (or the central computer or other transmission system) could make available a "start code" only at a certain time (e.g. 8:00 PM) to students calling in for the code. Students would also have a specified window to call in and register a score code at the end of the test. This simultaneity deters students from calling earlier test-takers to get their answers to the test questions.

Test-taker substitution, another form of cheating, is also deterred by the inclusion of corroborative data into the encoded test result that is transmitted from the testing computer to the central computer. Such corroborative data could include a biometric identifier of the test-taker or of a witness to the testing (e.g., a proctor), other forms of witness identifier entered via a keypad or other input device, or a location datum from a GPS receiver. In any of these cases, the corroborative data deters cheating by providing independent assurance that the test was taken by whom, where, or when it was supposed to have been taken.

Certain ancillary elements used in conjunction with the educational testing device are well understood to those skilled in the art, and thus are not shown for purposes of clarity. For example, the design and construction of computers, clocks, computer memories, and software or hardware cryptographic algorithms, are well known to those skilled in the art and will not be described in detail herein.

Referring now to FIG. 1, there is shown a computer-based educational testing system comprising a testing computer 200 and a central computer 300. A test-taker at testing computer 200 can exchange information with the central computer 300 using a telephone 120 connected to a network, such as the Internet or a public switched network 110 provided by a local or regional telephone operating company ("TELCO"). However, those skilled in the art will appreciate that the Internet, dedicated data lines, cellular telephony, Personal Communication Systems ("PCS"), microwave links, satellite systems, and/or any other direct or indirect communication link could also be used. The educational testing system facilitates the administration of a test, the sending of the test results 1110 to the central computer 300, the verification of those results, the generation of a performance indication 1150, and the transmission of that information to an end user. The end user could be the test-taker himself, his parent, his teacher, a college admissions office, or any other party having an interest in the performance of the test-taker. In the exemplary embodiment shown in FIG. 1, the performance indication 1150 is shown as being returned over the public switched telephone network 110 to an end user at telephone 120 for entry into the testing computer 200.

Figure 2:
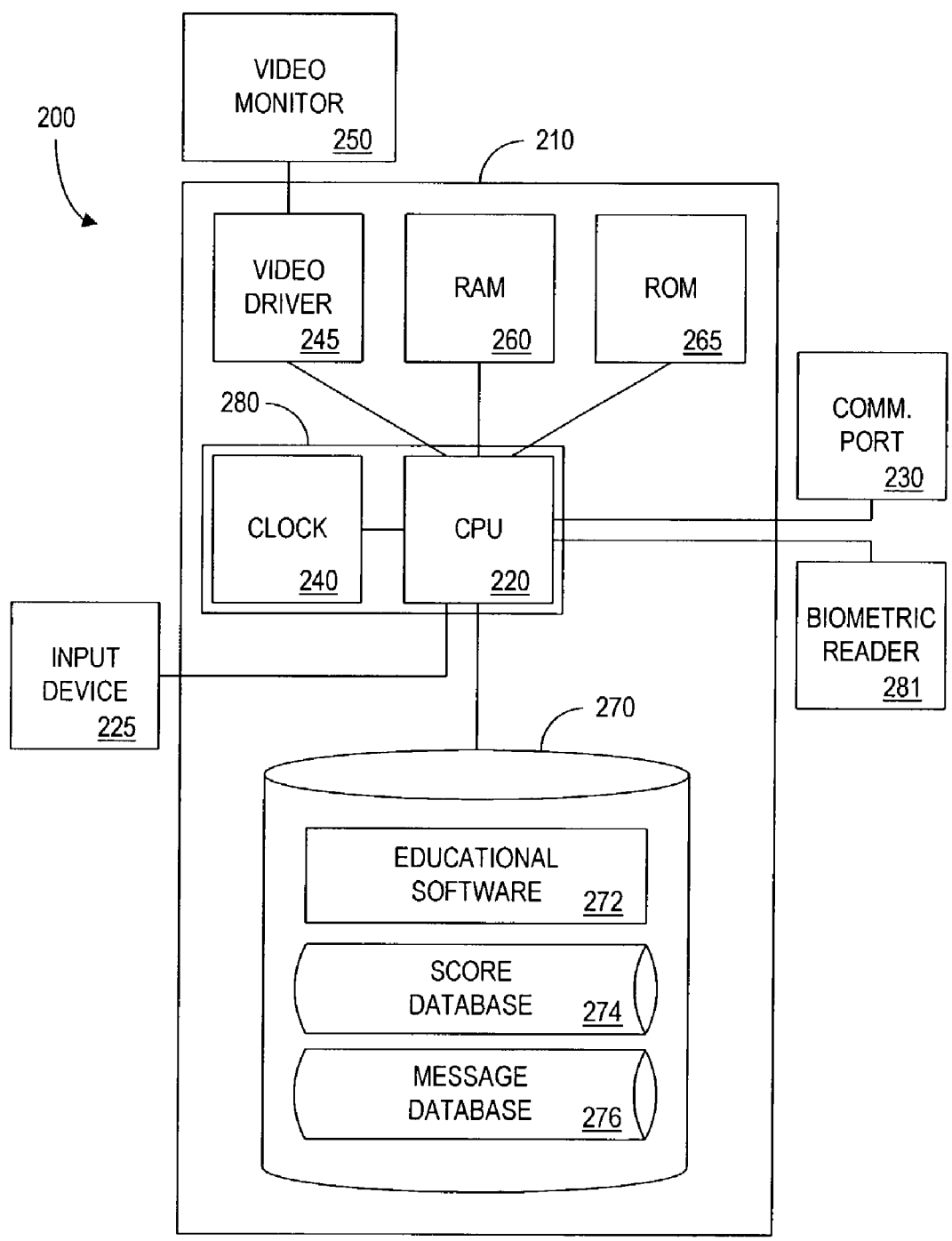
FIG. 2 illustrates one embodiment of a device for administering a test at a test-taker's home.

As shown in FIG. 2, the testing device 200 could be a conventional personal computer 210 having a CPU 220, an input device 225 (e.g., a keyboard and/or mouse), one or more communications ports 230, a clock 240, a display driver 245, a display (e.g., a video monitor) 250, RAM 260, ROM 265, and a data storage device 270. The testing computer may also be a game machine (e.g., Microsoft XBox, Sony Playstation, Nintendo GameCube), a portable device such as a graphing calculator or Palm Pilot, or interactive television.

The storage device could either be fixed media (e.g., a hard disk) or a drive capable of reading removable media (e.g., a floppy disk or CD-ROM). The storage device may be used to store the educational software 272, the score database 274, and message or audit databases 276. The score database 274 contains the performance indication 1150 received from the central computer 300. The audit database 276 contains audit data produced by the educational software 272, or received from the central computer 300, such as a cumulative record of all tests taken by the test-taker. However, any of the foregoing may alternatively or additionally be stored on the central computer 300.

For security purposes, one or more of the CPU 220, the clock 240, the RAM 260, the ROM 265, or the data storage device 270, can be located within a secure perimeter 280. Secure perimeter 280 may include physical, electronic, or a combination of physical and electronic features to resist tampering. For example, physical features could include encapsulation, electronic features could include a silicon firewall, and combination features could include self-zeroizing, or otherwise volatile, RAM 260 or ROM 265 which electrically modifies its contents upon detection of tampering. Such tampering might include physically stressing the device or attempting to change the clock rate by modifying its power source (not shown in the Figure) to operate outside an allowable voltage or frequency range. Alternatively, secure perimeter 280 could be merely tamper-evident. As will be appreciated by those skilled in the art, a great variety of tamper-resistant/tamper-evident techniques can be deployed, and will not be enumerated in detail herein. Therefore, as a matter of convenience, terms such as "tamper resistant", "tamper evident", or "secure" shall be understood to refer to any of the aforementioned or other security measures throughout this discussion.

The testing computer 200 may optionally be connected, via communications port 230, to a communication device (e.g., a modem, a network card, or a transmitter) to allow communications with the central computer 300. Finally, for security purposes to be described later, the testing device 200 may also include a biometric reader 280 such as a fingerprint reader or retinal scanner.

Figure 3:
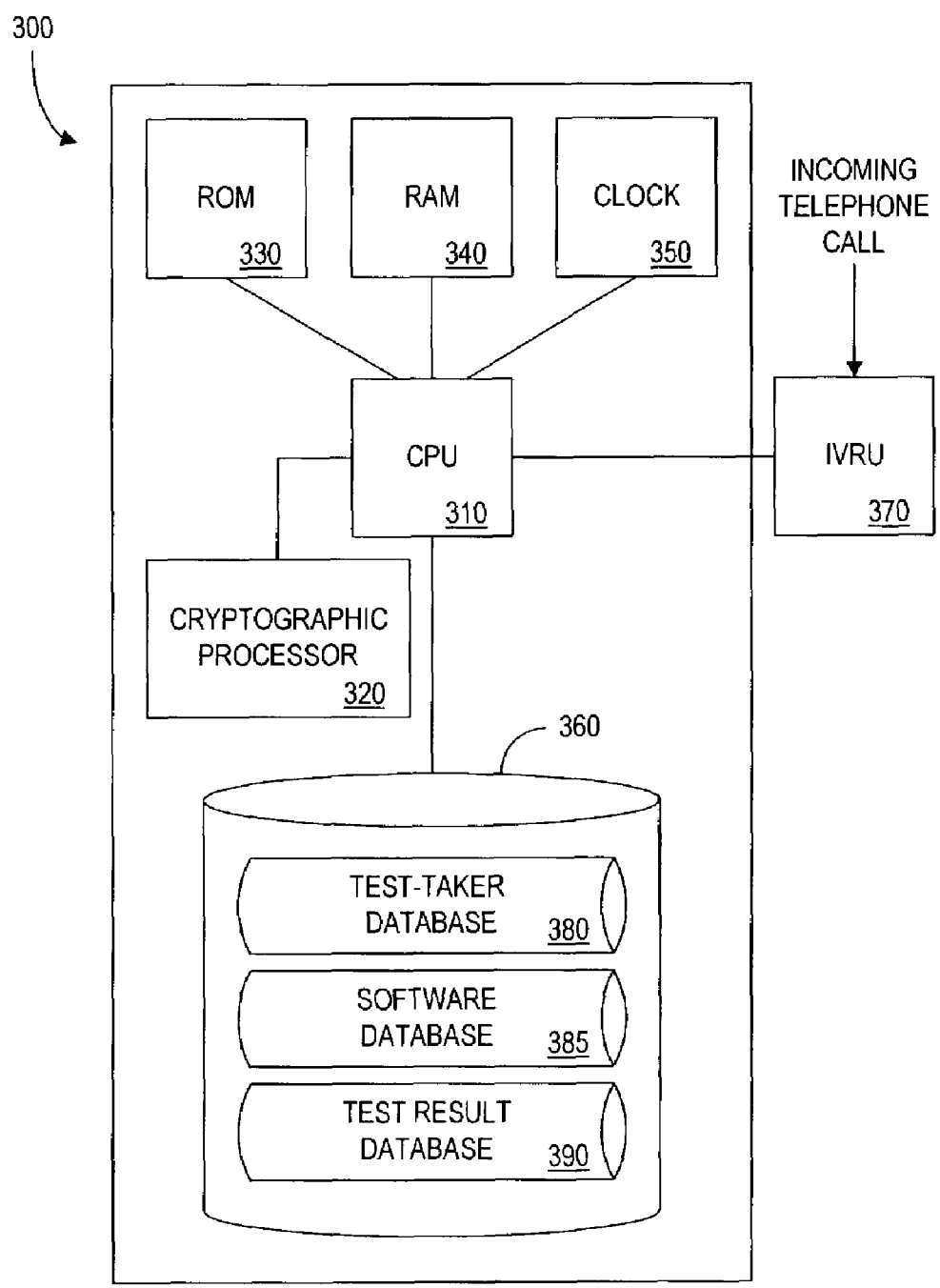
FIG. 3 illustrates one embodiment of a central computer for receiving test results from a testing device, performing a comparative evaluation with selected norms, and returning a performance indication for the test-taker.

As shown in FIG. 3, the central computer 300 includes a central processor 310, cryptographic processor 320, ROM 330, RAM 340, clock 350, and data storage device 360. In some cases, the cryptographic processor 320 might be a specially secured, dedicated processor separate from the central processor 310. Alternatively, the cryptographic processor 320 could be integrated in the central processor 310. Thus, any conventional personal computer, computer workstation, or mainframe computer having sufficient memory and processing capabilities may be used as the central computer 300.

In an embodiment of the invention, the central computer 300 is connected to an interactive voice response unit (IVRU) 370 for receiving test results 1100 (see FIGS. 1 and 11(a)) from the test-taker via touch-tone signals transmitted over phone network 120. This process will be described in greater detail below with respect to FIG. 6. IVRUs are well known in the art (see, e.g., Jerry Fitzgerald, "Business Data Communications—Basic Concepts, Security & Design," 4th ed., John Wiley & Sons, 1993, incorporated herein by reference) and need not be described in detail here.

The central computer 300 receives the encoded test result from the test-taker, decodes them using central processor 310 and/or cryptographic processor 320, and compares the decoded test results against test benchmarks stored in software database 385 or test result database 390. The central computer 300 then generates a performance indication 1150 (see FIG. 1) containing its evaluation and returns the performance indication 1150 to the end user. Because the central computer 300 might be simultaneously performing these operations for a multitude of test-takers, it might be capable of high volume transaction processing and of performing a significant number of mathematical calculations in processing data inquiries. Thus in an embodiment of the invention, a relatively powerful microprocessor that has a wide data bus would be a suitable central processor. Typical of such processors are the Intel Pentium or the Motorola PowerPC 604, which both employ a 32-bit data bus.

The cryptographic processor 320 supports verification of the encoded test result 1100 received by the central computer, as well as encoding of the performance indication 1150, subsequently returned to the end user. Any suitable microprocessor may be used for the cryptographic processor 320. For example, in its 16 MHz configuration, the Motorola MC68HC16's fast 16-bit multiply-and-accumulate instruction requires less than one second to perform a 512-bit RSA private key operation. Other commercially available specialized cryptographic processors include VLSI Technology's 33 MHz 6868 or Semaphore Communications' 40 MHz Roadrunner284. Alternatively, the cryptographic processor 320 may also be configured as part of central processor 310.

Data storage device 360 reads either fixed storage media within the central computer 300, or removable storage media external to the central computer 300. Such media could include high capacity magnetic (e.g., hard disk), optical (e.g., CD-ROM), or magneto-optical media, as well as low capacity media such as flash memory. Stored on these media are test-taker database 380 and test result database 390. Test-taker database 380 maintains data on the test-taker and/or end user, including names, personal ID numbers, phone numbers, private key information, e-mail addresses, physical addresses, software owned, etc. Test result database 390 maintains data on all test results sent to the central computer 300. The test results will be discussed in greater detail below with respect to FIG. 11(*a*), but might include various ID numbers (e.g., test-taker, testing device and testing software), and an indication of answers to the test questions (e.g., questions answered correctly/incorrectly, or slowest/fastest).

Figure 4:
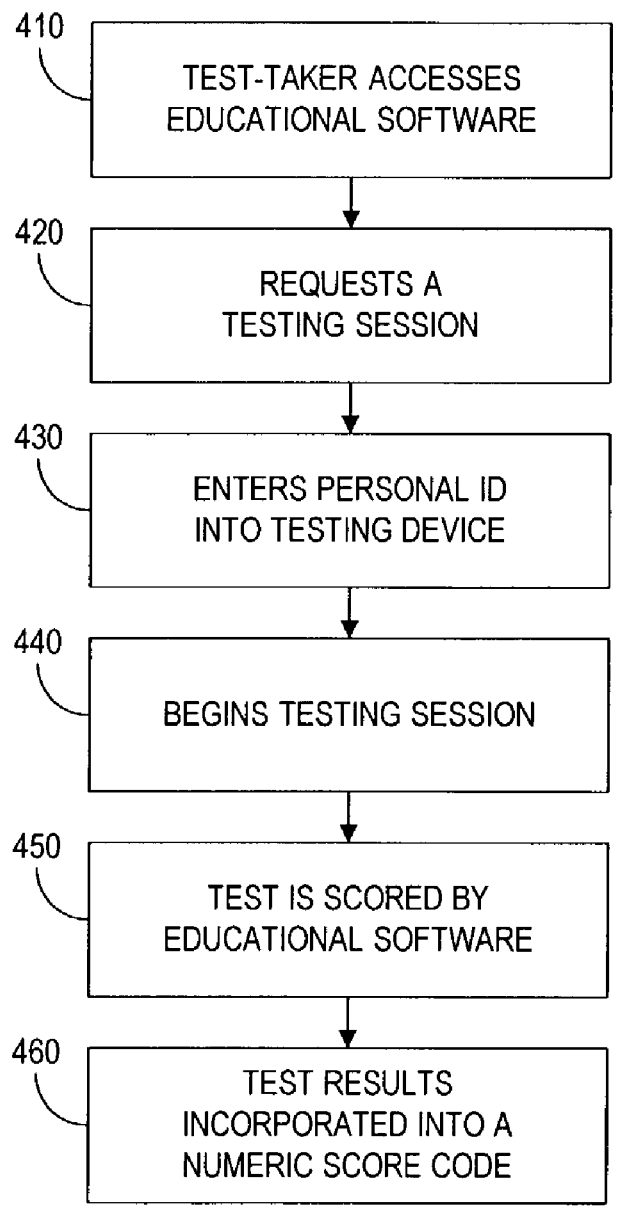
FIG. 4 illustrates an exemplary test administration procedure.

Referring now to FIG. 4, there is shown an exemplary embodiment of a process for administering a test. As a matter of convenience, the elements of the system will be referenced as numbered in FIGS. 1-3, although such numbering is not shown in the process description of FIG. 4, and although the process may be performed using systems other than that described in FIGS. 1-3. The particular arrangement of elements in FIG. 4, as well as the other figures discussed herein, is not meant to imply a fixed order to the steps; embodiments of the present invention can be practiced in any order that is practicable.

At step 410, the test-taker sits down at the testing computer 200 and, at step 420, requests a testing session from the educational software 272. This software is loaded into the RAM 260 of the testing device 200 to be executed by its CPU 220. At step 440, the testing software instructions appear on the video monitor 250 requesting that the test-taker enter his personal ID number for identification. At step 430, the testing process begins, with test questions being displayed on the video monitor 250.

In an embodiment of the invention, test questions are not based on variable data, but are instead fixed and known ahead of time. In another embodiment, test questions are based on variable data, and may be personalized to details known to the test taker. For example, questions may be based on a reward that is selected by the test taker or for the test taker. For example, if a reward for a test taker is a bicycle, one test question could relate to bicycles.

Test questions may also be associated with events, such as sporting events. Such an embodiment can be advantageous by providing the user with a reminder (e.g., by seeing the sports event) to take the test. Further, in an embodiment of the invention test questions might only be answerable upon certain events (e.g., immediately after the sporting event has taken place). Similarly, earning rewards may be conditioned upon certain events.

The test-taker supplies answers through the keyboard or mouse 225, and continues until the testing process is complete. Questions can include true/false, multiple choice, fill-in-the-blank, or any other format (preferably machine-scorable format).

At step 450, the software 272 scores the test by comparing the answers provided by the test-taker to the correct answers which are stored, e.g., within the educational software 272. At step 460, the test results are incorporated into a numeric score code, which includes not only the number of correct/incorrect answers, but also an indication of which answers were incorrect. In a twenty-question geography test, for example, the score code might indicate that three answers were wrong, and that questions number six, twelve, and seventeen were missed. As shown in FIG. 11(*a*), the encoded test result 1100 might also include data on the amount of time required to answer each question, as well as identifying information as to the testing computer 200, software 272, and test-taker.

Figure 5:
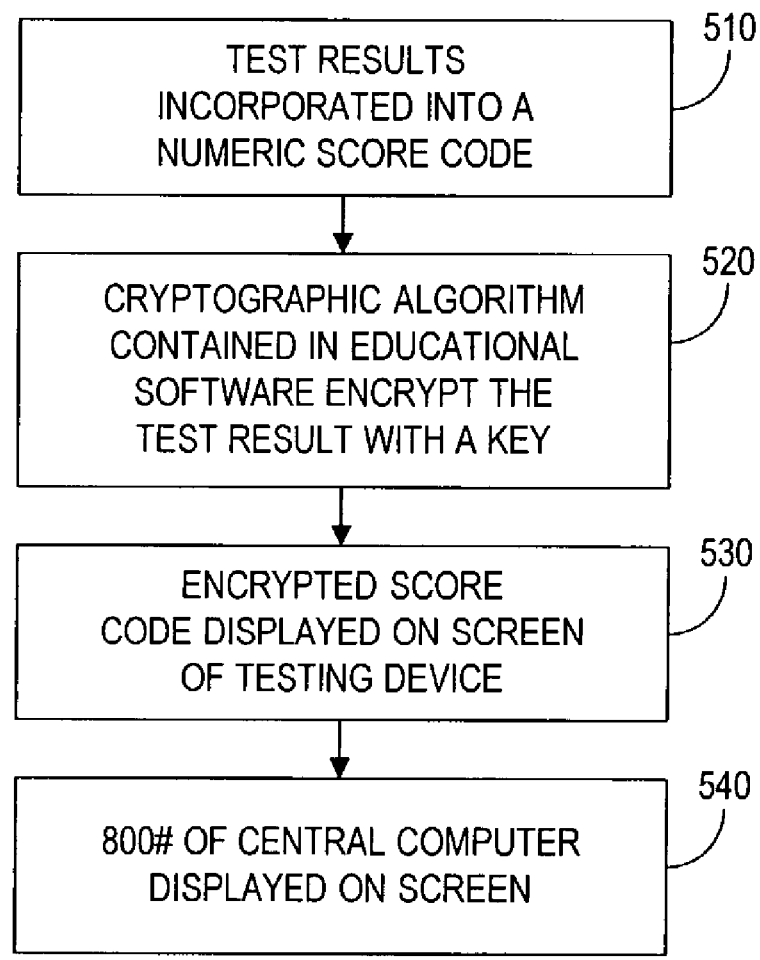
FIG. 5 illustrates an exemplary test result encoding procedure.

FIG. 5 illustrates an exemplary embodiment of a process for encoding the test results at the home testing computer 200. The process begins, at step 510 (substantially the same as step 460 of FIG. 4), by incorporating the test results into a numeric score code 1100. At a minimum, to prevent fraud by a dishonest test-taker, the test results should be encoded using a secret algorithm (e.g., scrambling or digit replacement techniques), known only to the testing computer 200 and the central computer 300. Stronger forms of encoding, which use cryptographic protocols, could also be used to encode the test results. Thus, at step 520, a suitable cryptographic algorithm is used for encoding the test result. For example, if the cryptographic operation constitutes encryption, RSA could be used for public key (asymmetric) encryption. The keys could be arbitrary, or they could be based on the testing computer ID number or test-taker's personal ID number. While encryption in the testing computer's private key is particularly appropriate if authenticity is required, encryption in the central computer's public key is appropriate if confidentiality is desired. If both authenticity and confidentiality are desired, a double encryption could use both the testing computer's private key and the central computer's public key. Furthermore, secret key (e.g., DES) encryption could be used if the stronger protections of public key cryptography are not required or if public key cryptography is too computationally intensive. Finally, although asymmetric or symmetric cryptographic techniques are described herein, those skilled in the art will appreciate that many other cryptographic techniques can also be used, as will be described below in the section entitled "OTHER EMBODIMENTS OF THE INVENTION." These encoding protocols can be implemented in software or hardware, and can be made more secure by including the algorithm and keys in secure perimeter 280. Continuing now with FIG. 5, the encrypted test result 1100 is displayed on the monitor 250 of the testing computer 200, at step 540, along with an 800 number to call, at step 550.

Figure 6:
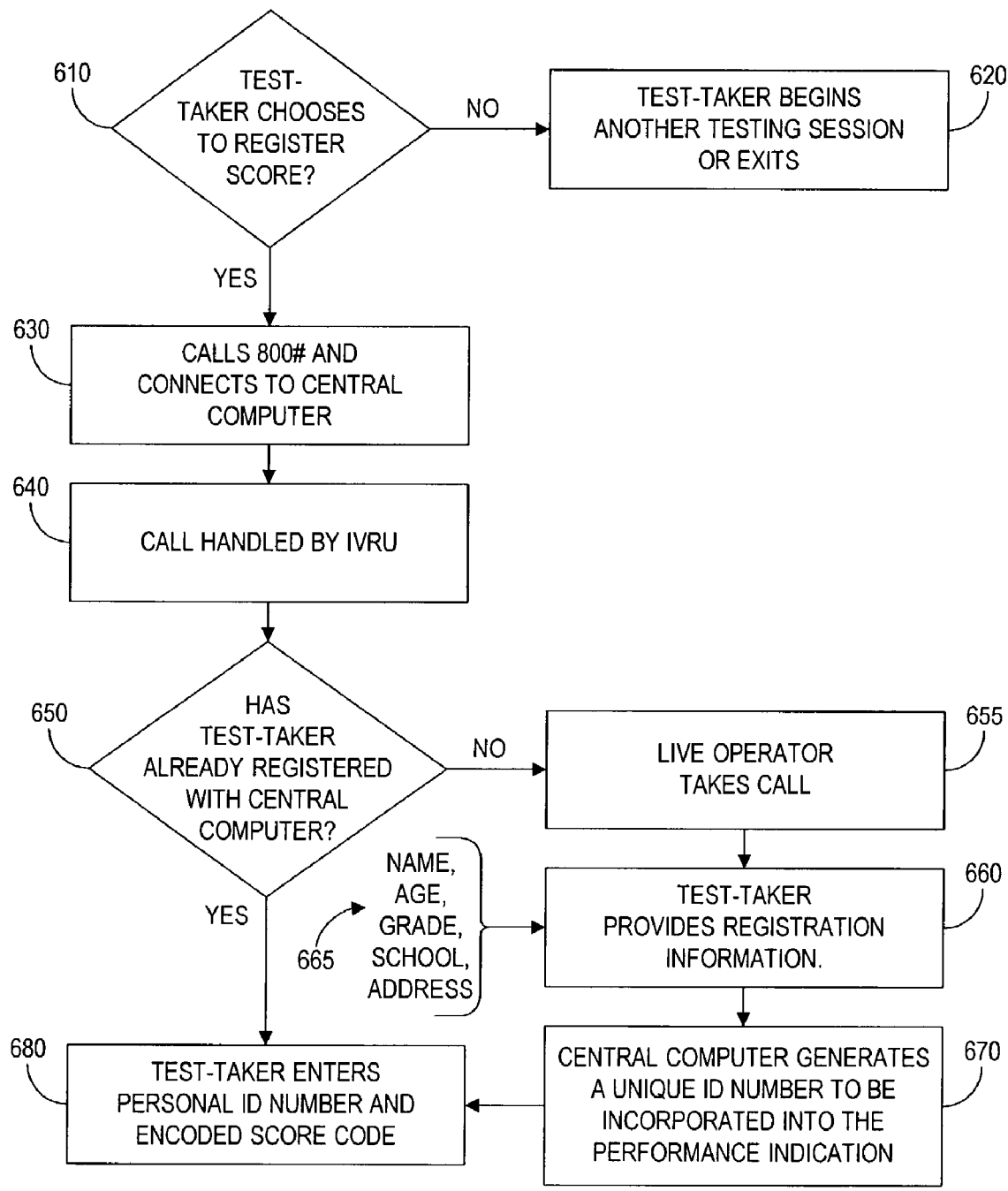
FIG. 6 illustrates an exemplary test result transmission procedure.

Referring now to FIG. 6, there is shown an exemplary embodiment of a process for transmitting the encoded test result 1100 to the central computer 300. At step 610, at the conclusion of the testing session, the test-taker may be given an option whether or not to register his score. If he believes that he has performed poorly, he may decide not to register. In an embodiment of the invention, the test results are displayed on the video monitor 250 only in encoded form, which would be unintelligible to the test-taker. Thus, a good result would be indistinguishable from a bad result because neither would appear in plaintext form. This would help discourage fraud in the form of continuous retaking of a test until a good result was achieved.

If the test-taker decides not to register, at step 620, he begins another testing session or exits from the software. If the test-taker decides to register, at step 630, he calls the 800 number displayed on the monitor 250 and, in step 640, connects with the IVRU 370 of the central computer 300. At step 650, if the test-taker has previously registered himself with the central computer 300, he continues with test result transmission at step 680. Alternatively, if the test-taker has not yet registered himself with the central computer 300, the call may be transferred at step 655 to a live operator to whom the test-taker provides registration information 660. As shown in block 665, such information might include the test-taker's name, phone number, address, age, school, grade level, end user (e.g., a parent or the test-taker himself) to receive the performance indication, educational software ownership. At step 670, a unique personal ID number is then assigned to the test-taker. The central computer creates a database record for this information in the test-taker database 380, which is indexed by personal ID number. The test-taker is then fully registered with the central computer 300 and is ready to transmit the encoded test result 1100. At step 680, the testing computer 200 displays the encoded test result 1100 to the test-taker, who subsequently manually telephones the central computer 300 and uses his touch-tone keypad to transmit his personal ID number and the encoded test result 1100 to the central computer 300 in response to voice prompts from the IVRU 370.

Figure 7:
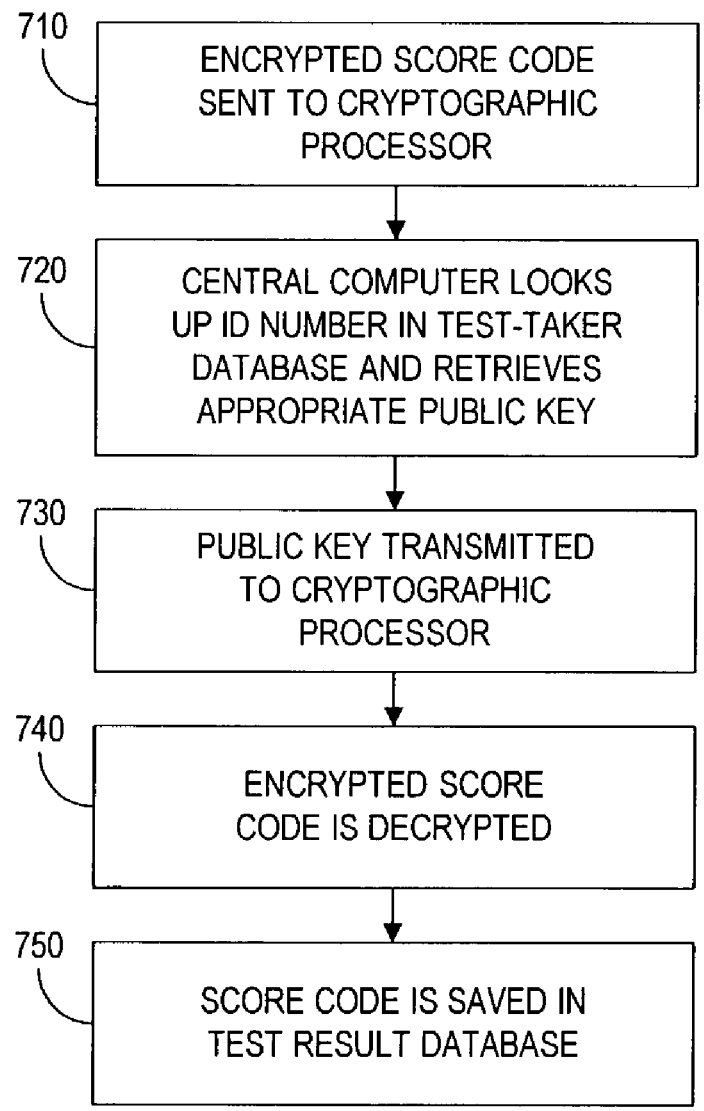
FIG. 7 illustrates an exemplary decoding procedure at the central computer.

Referring now to FIG. 7, there is shown an exemplary embodiment of a process for decoding the encoded test result 1100 at the central computer 300. At step 710, the encoded test 1100 result is sent to the cryptographic processor 320. At step 720, the central computer 300 looks up the personal ID number in the test-taker database 380 and retrieves the appropriate key to decrypt the encoded test result 1100. If asymmetric cryptography is used, this would be the public key corresponding to the test-taker's private key; if symmetric cryptography is used, this would be the same secret key used for the encryption at the testing computer 200.

Upon receipt of the decryption key, at step 730, the cryptographic processor 320 decrypts the encoded test result 1100 at step 740, thereby verifying that the score code was produced by the personal ID provided therein. The decrypted score information is then stored within test result database 390 at step 750.

Figure 8:
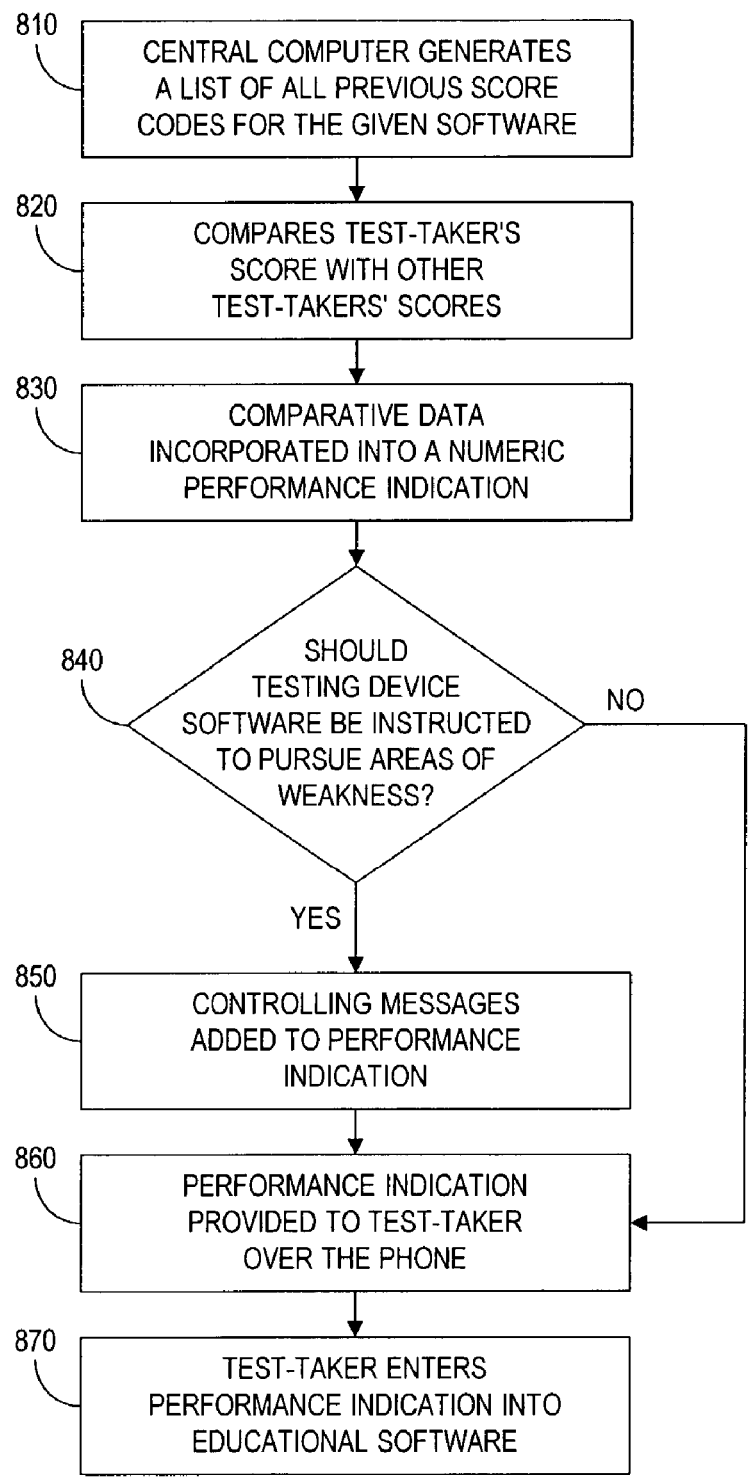
FIG. 8 illustrates an exemplary performance assessment procedure.

Referring now to FIG. 8, there is shown an exemplary embodiment of a process for evaluating the decoded score code at the central computer 300. At step 810, the central computer 300 takes the test result and initiates a search for comparative scores. Within the numeric code of the test result is the software ID number, identifying the software used for that test session. To find other test results for this software, the central computer 300 sorts the test result database 390 by software ID number, retrieving only those records that pertain to the software package 272. These records could be further narrowed, for example, by restricting them to those records generated by test-takers of the same age or grade level. The test-taker's test result is then compared relative to the performance of an appropriate reference group, another other test taker, or some other test benchmark, to generate a simple statistical comparison such as percentile rank.

At step 830, these comparative data are incorporated into a numeric performance indication 1150, which will be given to the test-taker for input into the software package 272 that generated the test result (see FIG. 1). If the test result indicates a particular area of weakness, the central computer 300 can generate a control message that directs the testing computer's software package 272 to focus on that particular weakness during subsequent testing sessions by modifying the testing computer's operation in response to the control message. For example, if the test-taker is consistently missing fractions questions during math tests, the testing computer 200 could be directed to tutor the test-taker in that subject or ask more questions of that type on the next math test. Each software package could have hundreds of methods to focus future tests, each method tied to a control message stored in a software database 385 of the central computer 300 and in message database 276 of testing computer 200. In the above example, focusing on fractions might be expressed as control message "324" of the software database record for the math software. As shown in step 850, such control messages are included along with the evaluative data in the performance indication 1150 before it is provided to the test-taker (or other end user) at the end of the test result transmission call. The test-taker enters the performance indication into the educational software 272 that generated the test result, triggering the software 272 to display the evaluative data generated by the central computer 300.

Figure 9A:
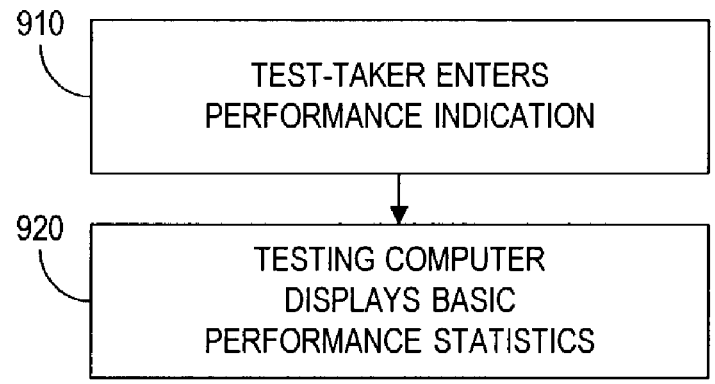
FIGS. 9(a) and 9(b) illustrate exemplary procedures for providing the performance indication to the user.

The performance indication 1150 could use cryptographic techniques, similar to those used for the test results, to ensure authenticity and/or integrity. Referring now to FIG. 9(a), there is shown an exemplary embodiment of a process for providing the performance indication 1150 to the test-taker. At step 910, the test-taker enters the performance indication 1150 into the testing computer 200, which verifies the performance indication 1150 to ensure that it is valid. Then, at step 920, the testing computer 200 displays basic statistics as to the relative performance of the test-taker. The amount of information contained within the performance indication is limited by its transmission between the test-taker (or his parent) and the central computer 300 in audio form over the telephone 120 of FIG. 1, including such factors as the amount of data the test-taker is willing to enter or the rate at which the test-taker can listen to and enter the data.

Figure 9B:
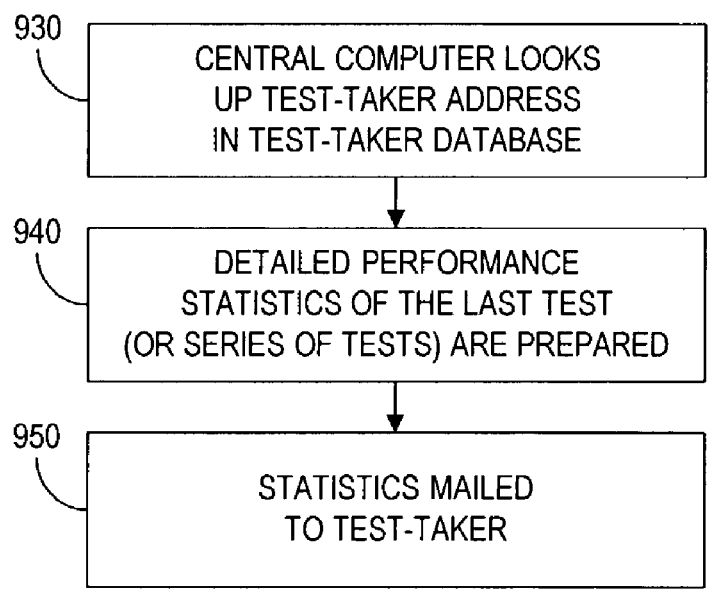

Those skilled in the art will appreciate that other transmission methods, such as the use of Dual Tone Frequency Modulator ("DTFM") or other modulated tones, can significantly increase the amount of information transferred without requiring the test-taker to manually enter the data. In that case an acoustic coupler/demodulator associated with the testing computer 200 would convert the audio DTFM tones into a digital bitstream without any human intervention. Of course, such modulated tones could also be used for the initial transmission of the encoded test result 1100 from the testing computer 200 to the central computer 300. Alternatively or additionally, the central computer 300 could also generate a detailed comparison report to be mailed to an end user (perhaps the test-taker himself), as shown in FIG. 9(b). The test-taker would make such a request via, or during transmission of, the encoded score code 1100 sent to the central computer 300 using the IVRU 370. These more detailed test results could indicate how well the test-taker has performed based on his total score, and/or individual questions, based on an appropriate geographic or demographic test benchmark.

It was mentioned previously that the performance indication 1150 may be provided to the test-taker for input into the testing computer 200. Alternatively, the performance indication 1150 may be provided to an end user other than the test-taker himself. Either way, the performance indication 1150 represents a certification of the test result, by the central computer, to an end user monitoring the test-taker's performance. Thus, the performance indication 1150 may incorporate a reward attainment message, specifying the test-taker's achievement of a specified performance level, that can be subsequently accessed by the end user at some time after the testing session.

Figure 10:
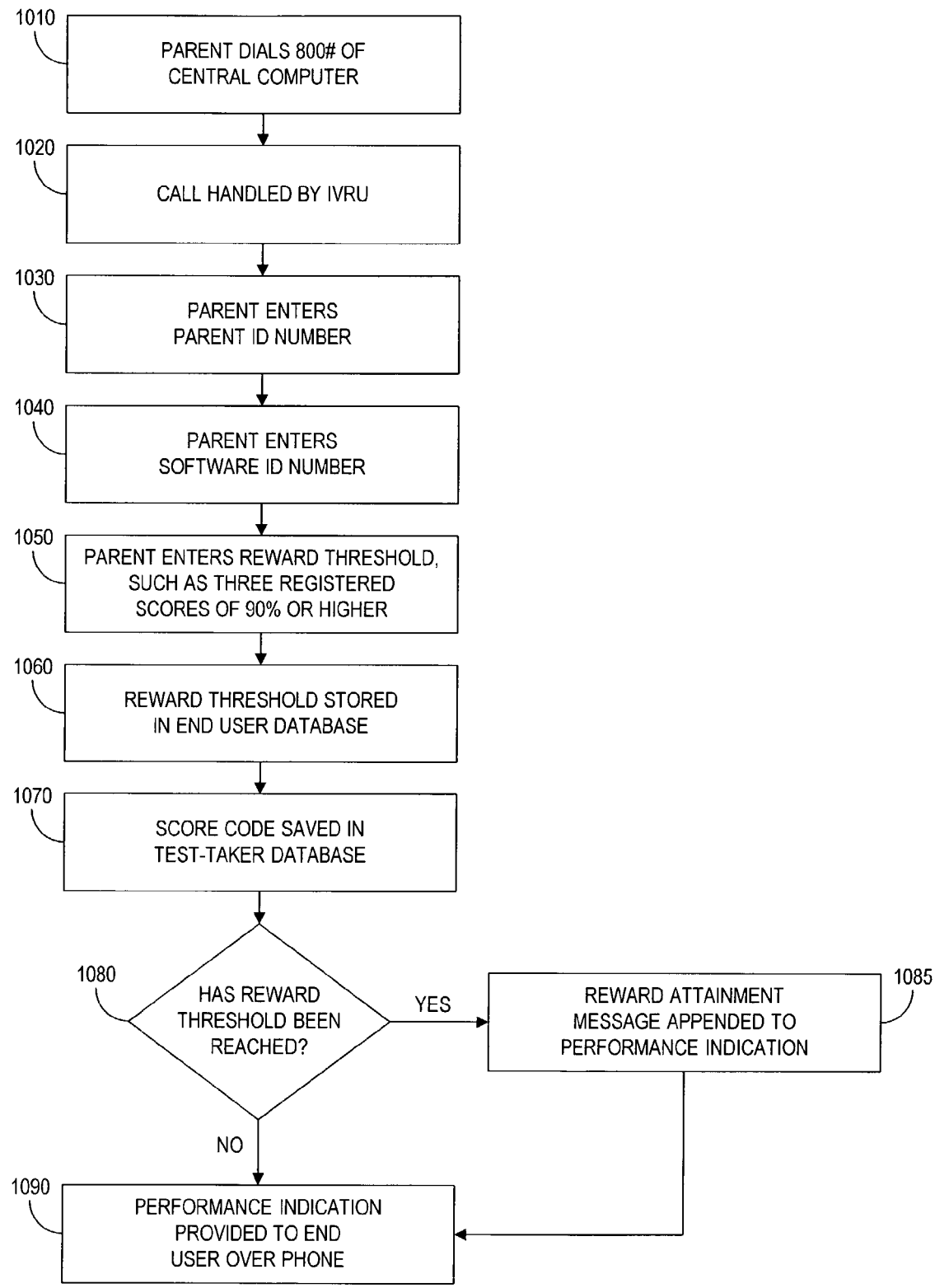
FIG. 10 illustrates an exemplary reward mechanism.

Referring now to FIG. 10, there is shown an exemplary embodiment of a process for an end user to administer a reward system based on the performance indication 1150. The reward system consists of two stages: specifying a reward level (in steps 1010-1060) and checking the child's performance (in steps 1070-1090). At step 1010, the test-taker's parent (or teacher or other person) communicates with the central computer 300. For example, the parent may call an IVRU using a telephone in a manner similar to the test-taker's test result registration process. Alternatively, the parent employs a personal computer running browser software to access a web site in a manner known in the art.

During initialization, the parent is prompted (at step 1020) by the central computer to enter his ID number (at step 1030), the software identifier (at step 1040), and a reward threshold to be monitored by the central computer 300 (at step 1050).

The reward threshold could be in addition to, or part of, the test benchmark described previously in the content of test result evaluation. For example, the reward threshold could be "improve the user's math scores by a factor of two", or "increase the user's math scores to the top thirty percentile of all sixth graders". The parent may also be prompted to enter the particular reward to be earned (e.g., a bicycle), or a general type of reward to be earned (an educational video tape). In another embodiments, the test taker may enter the desired reward or a set of desired rewards. For example, a test taker may indicate a "wish list" (set of desired rewards) by browsing a website (e.g., a site which advertises products for sale). Alternatively, a wish list may be created automatically for the test taker by using data mining techniques known in the art.

During a subsequent testing session, at steps 1070-1080, the central computer 300 checks the score code saved in the test-taker database 380 against the specified reward threshold. If appropriate, at step 1085, a reward attainment message is included in the performance indicator 1150 provided to the test-taker. The test-taker then enters the performance indication 1150 into the testing computer 200 where it can be accessed at a later time by the test-taker's parent. Alternatively, the parent could himself communicate with the central computer 300 to directly receive the performance indication 1150 including the reward attainment message. The parent could then use the reward attainment message to provide a designated reward to the test-taker. In an embodiment of the invention, the reward comprises an activation code that "unlocks" (i.e. permits the use of) software functionality (e.g., in a game) or DVD functionality (e.g., certain footage or features).

In an embodiment of the invention, the reward threshold could be stored on the testing computer and thus the testing computer is capable of assessing the test takers relative progress in meeting the specified goal. The testing computer could then provide the test taker with reward attainment messages, such as messages of encouragement (e.g., "good answer"), messages which indicate what remaining tasks must be accomplished before the goal is earned (e.g., "answer three more long division problems correctly to earn the bicycle", "you're half way to earning the bicycle"), and messages which remind or inform the test taker what the reward will be ("your reward will be a brand new, red ten speed"). The reward attainment message may further comprise an audio message of the voice of a known or famous personality.

Other devices besides the testing computer may output the reward attainment messages, typically but not necessarily upon a command by the testing computer or the testing computer. For example, the reward attainment messages may also be output by a personal computer, network terminal, telephone, game machine (e.g., Microsoft XBox, Sony Playstation, Nintendo GameCube) or toy. Such devices for outputting the reward attainment messages may receive the reward attainment message from the central computer or the testing computer. Alternatively, such devices may already store information representing the appropriate reward attainment message, or information which may be used to generate the appropriate reward attainment message. Thus, the appropriate reward attainment message could be recalled from storage upon command (e.g., from the central computer or the testing computer).

The reward attainment messages (as well as any other output described herein which is intended to be interpreted, in whole or in part, by a user) may comprise, e.g., displayed text, images, printed text or images, audio, email, and/or instant messages, which may be generated and provided to a user in a manner known in the art.

In an embodiment of the invention, a toy may be used as part of the educational testing system. Such a toy may be in communication with the testing computer 200, such as through any well known wireless signal protocol such as radio frequency or infra-red signals. The toy may output questions (e.g., audio from a doll), and/or may output messages to the user. The toy might require certain actions by the test taker. For example, the toy may tell the user that it needs to be fed correct test answers once per day.

Finally, in an embodiment the reward may be provided to the student only upon the student entering an authentication code. The testing computer may request the authentication code, and/or may provide a reminder (in any known form) to the user when the authentication code is due, when the reward is redeemable, or after a predetermined period of time has passed.

Other Embodiments of the Invention

The following are several examples which illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications consistent with the present disclosure.

1) Cryptographic Techniques

In an embodiment of the invention, encryption is an encoding protocol used for certifying the test results. Provided the encryption key has not been compromised, if the central computer 300 can decrypt the encrypted test result 1100, it is known to be authentic. Alternatively, the cryptographic technique of "one-way functions" may be used to ensure test result integrity. As used herein, a one-way function is one that outputs a unique representation of an input such that a given output is likely only to have come from its corresponding input, and such that the input can not be readily deduced from the output. Thus, the term one-way function includes hashes, message authenticity codes (MACs—keyed one-way functions), cyclic redundancy checks (CRCs), and other techniques well known to those skilled in the art. See, for example, Bruce Schneier, "Applied Cryptography," Wiley, 1996, incorporated herein b reference. As a matter of convenience, the term "hash" will be understood to represent any of the aforementioned or other one-way functions throughout this discussion.

Figure 12:
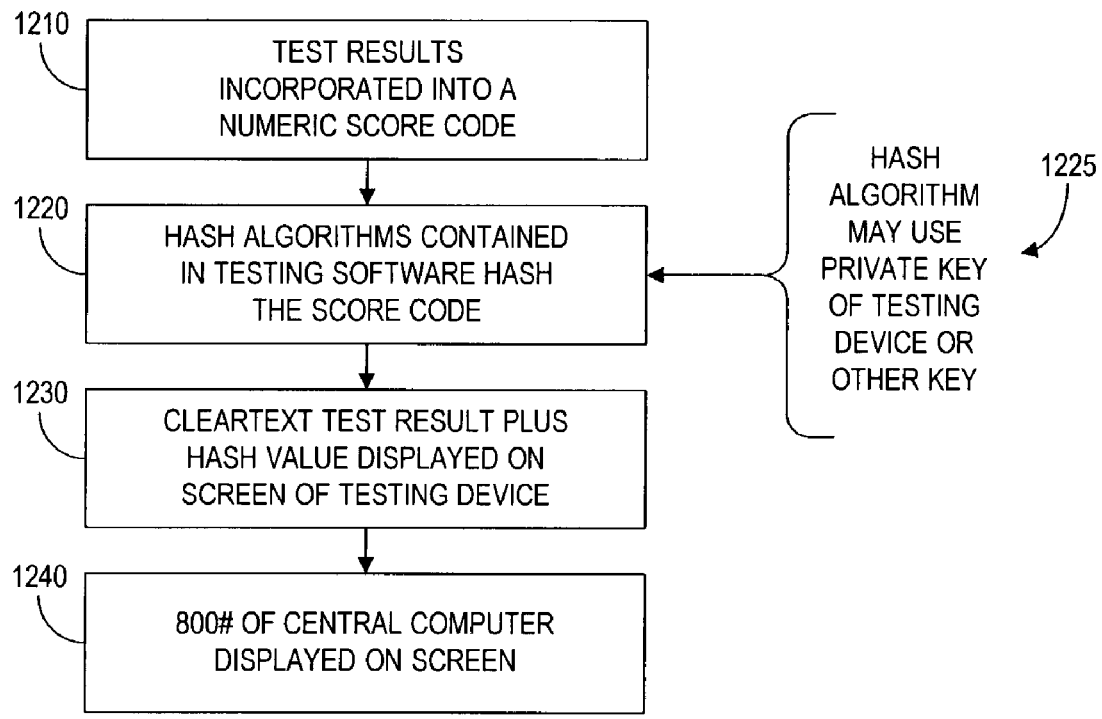
FIG. 12 illustrates an alternative embodiment of the invention wherein the test results are encoded using a cryptographic hashing operation.

Referring now to FIG. 12, there is shown an exemplary embodiment of a process for encoding test results at the testing computer 200 using hash functions. The process begins, at step 1210 (the same as step 510 of FIG. 5) with the testing computer 200 incorporating the test results into a numeric score code. As shown in step 1220, CPU 220 then uses a software hashing algorithm incorporated in software 272 to hash the score code. Alternatively, the hashing algorithm could be stored in RAM 260 or ROM 265, or it could be hardwired in a special dedicated cryptoprocessor (e.g., a test-taker's cryptographic token) separate from the CPU 220. The result is an encoded test result 1100 comprising the (cleartext) score code and a (ciphertext) one-way function representative of at least a portion of the score code. This encoded test result 1100 is displayed on video monitor 150, at step 1230, along with an 800 number for the test-taker to call to register the hash, at step 1240. Notice that, in contrast to the encryption embodiment in which the test result could be displayed only in encoded form, the hashed test result must also be made available to the central computer 300 in cleartext form. If it is desired to prevent the test-taker from seeing his actual test result (e.g., to prevent multiple test-taking as described previously), the hashing can be performed in conjunction with encryption. For example, in step 1225, the test result is first encrypted prior to hashing. Alternatively, the test result can first be hashed and then encrypted. The use of hashing followed by encryption is often referred to as a digital signature. The encryption operation ensures test result authenticity, in addition to the test result integrity provided by the hashing operation. Finally, instead of or in addition to encryption, a unique device identification number (see FIG. 11(*a*)) can be added to the encoded test result 1100 to provide assurance of authenticity.

Figure 13:
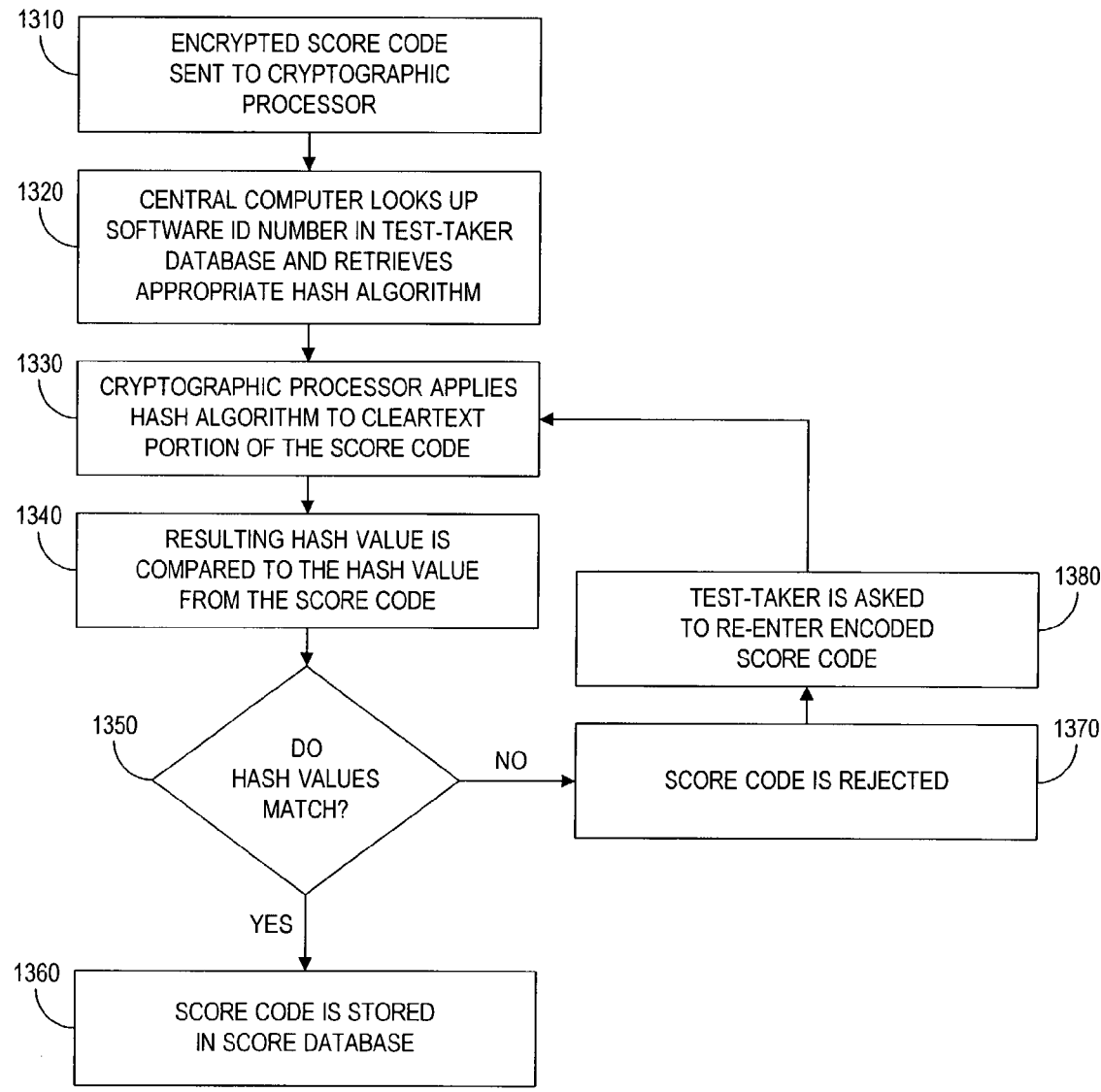
FIG. 13 illustrates an exemplary process for decoding the encoded test result corresponding to FIG. 12.

Referring now to FIG. 13, there is shown an exemplary embodiment of a decoding process corresponding to FIG. 12. At step 1310, the encoded test result 1100 is sent to central computer 300, which verifies the hashed test result by reading the cleartext part of the encoded test result (e.g., the score code and device or software ID) and the ciphertext part of the encoded test result (e.g., a hash of a portion of the cleartext part). At step 1320, the central computer 300 retrieves the appropriate hash function and, in step 1330, performs an identical hashing algorithm on the appropriate portion of cleartext part to recompute the hash. If the encoded test result uses any form of encryption in addition to hashing, the central computer 300 would locate and perform the appropriate cryptographic protocol to decrypt the encrypted portion of the test result in the appropriate manner. At steps 1340 and 1350, the received and recomputed hashes are compared to determine that the test result came from the testing computer 200 and had not been altered subsequent to transmission. If so, at step 1360, the score code is stored in score code database 274. Else, the score code is rejected at step 1370, and the test-taker is asked to re-enter the encoded test result at step 1380.

Certain well-known enhancements to public key cryptography could also be used to provide greater assurance. For example, the encoded test result could include digital certificates for public key distribution to a central computer 300 that does not know the testing computer's public key needed to verify a test result encrypted with the testing computer's private key. In a digital certificate, the testing computer's public key is encrypted (and vouched for) by the private key of a trusted certifier (e.g., a well known manufacturer of the measurement certification device) whose public key is known to the central computer 300. The central computer 300 uses the certifier's public key to decrypt the testing computer's public key, then uses the testing computer's public key to decrypt the encrypted test result. Alternatively, the central computer 300 could simply obtain the testing computer's public key from a publicly accessible database, eliminating the need for digital certificates.

Another commonly used cryptographic technique, the so-called challenge-response protocol (CRP), may be used to ensure to a recipient that an encoded test result is current, i.e., not a copy of a previously generated encoded test result. During test result registration, the central computer 300 generates and transmits a datum (also referred to as a "nonce") to the testing computer 200. The testing computer 200 then incorporates this random number in the encoded test result 1100 transmitted to the central computer 300. If the received random number matches the random number previously generated, the central computer 300 accepts the encoded test result 1100 as fresh. Conversely, an old encoded test result 1100 would contain a non-matching random number. Those skilled in the art will appreciate that the challenge can use any datum whose value is unpredictable by the testing computer 200; random numbers happen to be a particularly convenient choice.

Although public key and symmetric key cryptography have been described in the encryption of the test result, those skilled in the art will realize that simpler cryptographic protocols may also be used. For example, substitution ciphers or transposition ciphers offer lower levels of security, but require far less computing power and can be more easily integrated into a software package.

In another variation, the testing computer 200 includes a sequence number in the encoded test result 1100. This sequence number is incremented by one every time the testing computer 200 generates an encoded test result 1100. The central computer 300 stores the most recent sequence number in memory, and accepts a transmitted encoded test result 1100 if its sequence number is one greater than the last stored sequence number.

In yet another variation, the testing computer 200 includes the current time in the encoded test result 1100 transmitted to the central computer 300. The central computer 300 then checks the time included in the encoded test result 1100 against the time from the central computer's clock 350. If the times are within a prescribed window, the encoded test result 1100 is accepted as fresh.

In still another procedure, the testing computer 200 itself generates a random number to be included in the encoded test result 1100. The central computer 300 maintains a database of all random numbers received from all testing computers. If the new random number is not in that database, then the current encoded test result 1100 is accepted as fresh. If a time element is incorporated as well, then the central computer 300 only has to store a relatively small quantity of received random numbers.

In any of the above variations, reused encoded test results are prevented (or at least detectable) because a reused encoded test result would contain a datum corresponding to a previous request/reply pair, rather than the current datum.

Although certain exemplary cryptographic operations (hashing, asymmetric encryption, symmetric encryption, substitution ciphers, transposition ciphers, digital certificates, and challenge-response protocols) have been disclosed for use singly or in specified combinations, those skilled in the art will appreciate that many other combinations of these basic operations may be used, depending on the needs of the specific application.

2) Corroborative Data for Test-Taker Verification

The above-described cryptographic protocols are useful for deterring fraud in the form of test result modification. Corroborative techniques can be used for deterring fraud in the form of test-taker substitution. Biometric identification devices (e.g., a fingerprint reader, a voice recognition system, or a retinal scanner) may be used to provide absolute test-taker identity verification at the testing computer 200. An example of a fingerprint reader is the Startek FC100 FINGERPRINT VERIFIER, which connects to a PC via a standard interface card. The fingerprint verifier acquires a test-taker's fingerprint when the test-taker places his finger on an optical scanning lens, then scans, digitizes, and compresses the data (typically a 256 byte file) in memory. During testing, each live scan fingerprint is compared against a previously enrolled/stored template, stored in the testing computer 200. If the prints do not match, access to the educational software 272 can be denied. This procedure may be implemented: 1) before the start of a testing session, 2) during the testing session in response to prompts from the educational software, 3) at some predetermined or random time, or 4) continuously by incorporating the scanning lens into the testing computer 200 such that the test-taker is required to maintain his finger on the lens at all times during the testing session for continuous verification.

As another example of a biometric device, a voice verification system, located at either or both the central computer 300 and the testing computer 200, may utilize a person's "voice-print" to verify test-taker identity. The process of obtaining a voice-print and subsequently using it to verify a person's identity is well-known in the art, and will not be described in detail herein. Those of ordinary skill in the art will appreciate that suitable voice identification/verification technologies are commercially available from companies such as SpeakEZ, Inc. and others.

During initialization, the speaker identification software is used to sample the test-taker's voice, which is stored in the test-taker database 380 at the central computer 300. Each time the test-taker calls the central computer 300 to register a test result, the IVRU 370 prompts the test-taker to speak his or her name into the telephone 120. The speaker identification software then directs the central computer 300 to check the test-taker's current voice-print against the voice-print stored in the test-taker database 380. Unless there is a match, the test result registration procedure is aborted. The voice-print may also be stored in a database in the testing computer 200, to verify the test-taker's identity at that location prior to allowing a test session.

The above-mentioned biometric data are useful for corroborating the test-taker's identity. In addition, other forms of independent data can be added to the encoded test result 1100 to corroborate the testing process. For example, the biometric reader could be used to certify the identity of a witness to the testing process (e.g., a proctor) in addition to the identity of the test-taker himself. Of course, the witness could also be certified by inputting a unique witness identifier into a keypad or other input device at the testing computer 200. Alternatively, a Global Positioning Satellite (GPS) signal receiver could be incorporated with the testing computer 200 to provide a corroborative datum indicating the location of the testing computer.

3) Direct Communication between Testing and Central Computers

The above embodiments have been described with respect to a system utilizing an indirect connection between the testing computer 200 and the central computer 300, i.e., the test-taker himself acts as an information conduit between the testing computer 200 and the central computer 300, in conjunction with a telephone 120 and an interactive voice response unit 370. As discussed above with respect to the delivery of the performance indication to the test-taker, this may, among other things, limit the amount of information that can be conveyed between the testing computer 200 and the central computer 300. One solution, particularly when response time is not crucial, involves transmitting such information via non-electronic media (e.g., FIG. 9(*b*)).

Another solution is to establish an electronic connection between the testing computer 200 and the central computer 300 via a dial-up modem, a cable modem, a set-top box, or any other form of electronic communication. For example, conventional modems may be used for communications at rates from 1,200 to 33,000 bits per second (baud). Alternatively, ISDN modems, DSL modems or cable modems may be used for communications at higher rates. Finally, special network switches may be used in connection with even higher-speed communications links, e.g., over T1 or T3 lines. Any such a connection could allow the transmission of greater amounts of information, and could also allow the testing computer 200 to take advantage of the storage and processing capabilities of the central computer 300.

Further, the need for many actions could be reduced or eliminated. For example, a person need not communicate with the central computer 300 via a telephone, test results need not be encoded and decoded, performance indications need not be unintelligible to a user, and the performance indication need not be entered by the user into the testing device. Many other actions described herein (e.g., user registration, registering a test score) may be performed via a means such as a web browser operating on a computer, such as the testing computer 200.

For example, in an embodiment where the testing computer 200 may communicate with the central computer 300 via a data communication network (e.g., the Internet), the testing computer 200 may provide the central computer 300 with test results of a user. Similarly, the central computer 300 may provide the testing computer 200 with a "start code", a control message, and/or an attainment message.

Note that in many embodiments various functions of the testing computer 200 may be performed by the central computer 300, and vice versa. It is also possible that the central computer is not used, and the testing computer performs all required test scoring, etc.

In an embodiment of the invention, the central computer's network interface can be capable of supporting multiple, simultaneous data connections. In a preferred embodiment, the central computer 300 is accessible over the Internet or commercial on-line services such as America Online, thereby allowing multiple test-takers to access the central computer 300 via simultaneous on-line connections.

In another embodiment of the invention, the test questions would not have to be pre-stored at the testing computer 200, but could be stored at, and downloaded directly from, the central computer 300. This would give the testing authority much greater flexibility to keep test questions current and confidential. In addition, where the performance indication 1150 is provided to the central computer 300 on an ongoing basis rather than after completion of the entire test, future test questions could be customized in response to the test-taker's ongoing or historical performance. To the extent that downloaded questions are not known in advance by the testing computer 200, they will be unscorable by the testing computer 200. In such cases, the encoded test result 1100 transmitted from the testing computer 200 to the central computer 300 will include encoded but otherwise unscored test answers. The central computer 300 will then score the questions using an answer key as part of the test benchmark. Thus, as used in various exemplary embodiments of the invention disclosed herein, the term test benchmark could include any information useful for evaluating a test result transmitted from the testing computer 200 to the central computer 300. Furthermore, either or both of the test result and the test benchmark could include absolute, relative, or statistical information.

4) At-Home Testing

Figure 14:
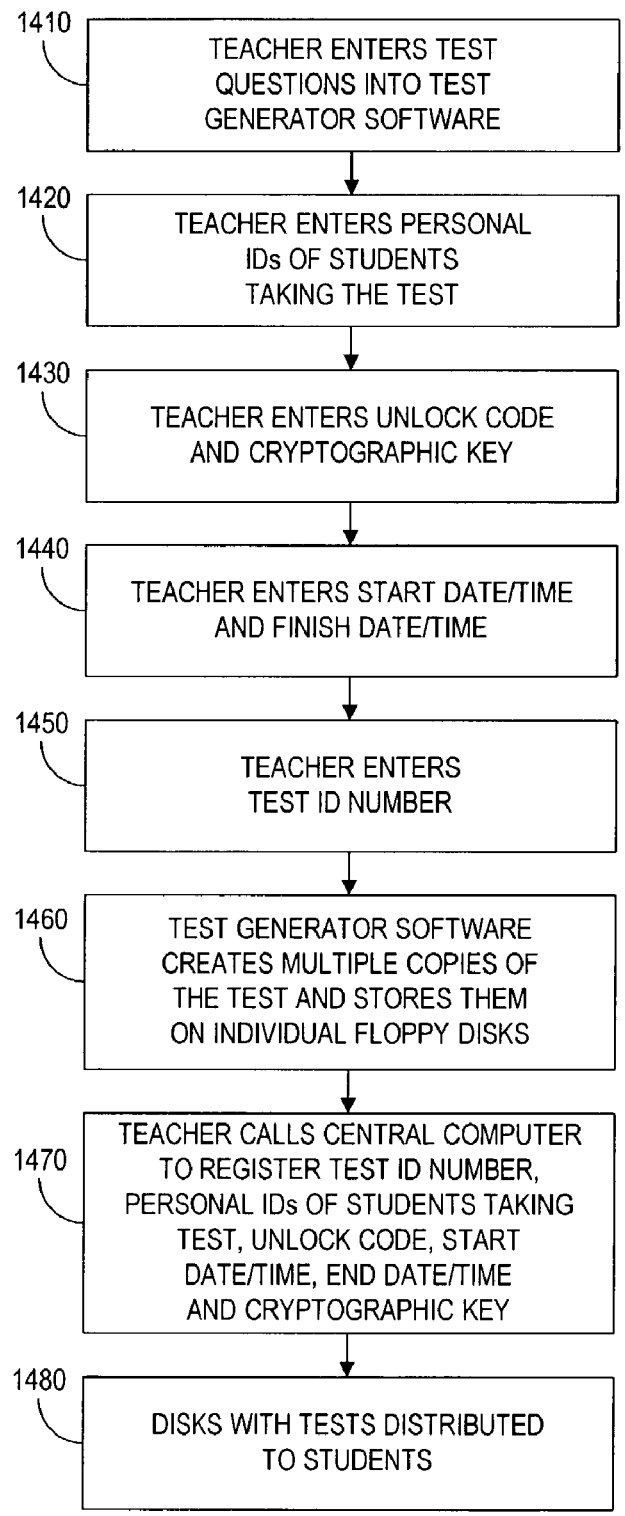
FIG. 14 illustrates an exemplary process for test question generation and distribution in a home testing application.

FIGS. 14-19 illustrate another embodiment of the invention in which the test questions are not pre-stored at the testing computer 200. Referring now to FIG. 14, there is shown an exemplary embodiment of a process for distributing tests to students for examinations taken at home. Teachers (or commercial testing services) create a set of floppy disks with test questions and distribute them to students to take the tests at a given start time. At step 1410, the teacher enters the test questions into the test generator software operating on a standard personal computer. At step 1420, the teacher enters the personal IDs of each student taking the test into the test generator software to ensure that only authorized students can take the test. At step 1430, the teacher enters an unlock code and one or more cryptographic keys of any desired type. The unlock code is used by the test-takers to activate the test session, while the cryptographic keys will be used by the students to encrypt their test results. At step 1440, the teacher enters both a start and finish time for the test, perhaps declaring that the test will begin at 1:00 PM on Saturday and end at 3:00 PM the same day. Lastly, the teacher enters a unique test ID number at step 1450, which allows the central computer 300 to track the results of the test. At step 1460, the test generator software writes tests onto individual disks. The test disks can take many forms including floppy disks, tape cartridges, magneto-optical disks, etc. The disks do not have to be identical. Each disk's questions could be arranged in a different order, or each disk could contain different questions. For example, the teacher could enter a large number of questions into the generator software with randomly selected subsets of these questions to be generated for different disks. The teacher completes the test generation process by calling the central computer 300 at step 1470, and using an IVRU or other electronic device to register the test ID number, personal IDs of the test-takers, unlock code, start time/stop time, and cryptographic key. The central computer 300 stores this information in a database for later use. At step 1480, the disks are distributed to the students.

Figure 15:
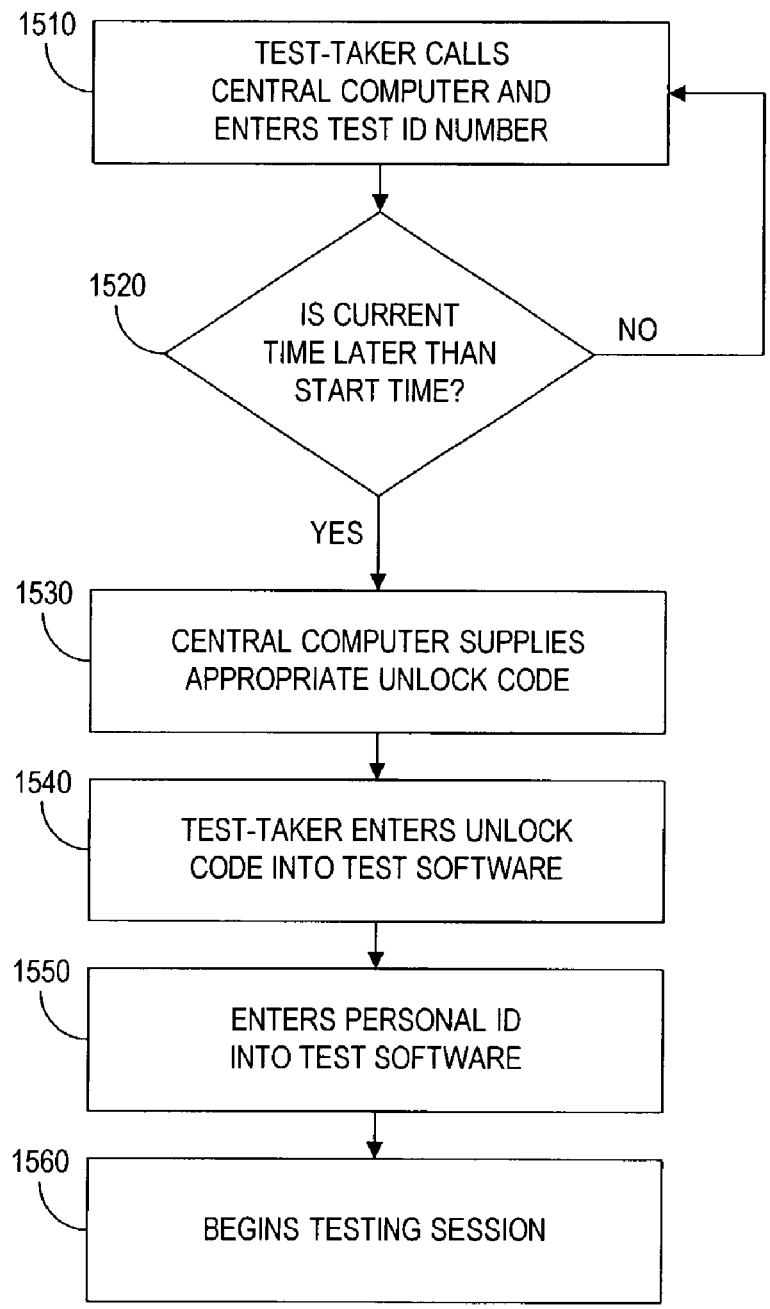
FIG. 15 illustrates an exemplary process for beginning a testing session in a home testing application.

Referring now to FIG. 15, there is shown an exemplary embodiment of a process for taking the distributed test. The test-taker brings the test disk home and puts it into his testing computer 200. Without the appropriate unlock code, however, the test-taker is unable to access the test questions. At step 1510, therefore, the test-taker calls the central computer 300 and enters the test ID number. This ID number is preferably printed on the disk itself. The central computer 300 accesses the test database 380 and retrieves the database record for that particular test ID number. At step 1520, the central computer 300 compares the current time to the designated start time of the test. If the current time is prior to the test start time, the test-taker is instructed to call back at the established start time. If the current time is within the time window of the test, the central computer 300 supplies the appropriate unlock code at step 1530. At step 1540, the test-taker enters this unlock code into the test software, allowing access to the software 272. At step 1550 he enters his personal ID number. If either of these values is not accepted by the test software, the test-taker is prevented from continuing. At step 1560 the test-taker begins the testing session.

Figure 16:
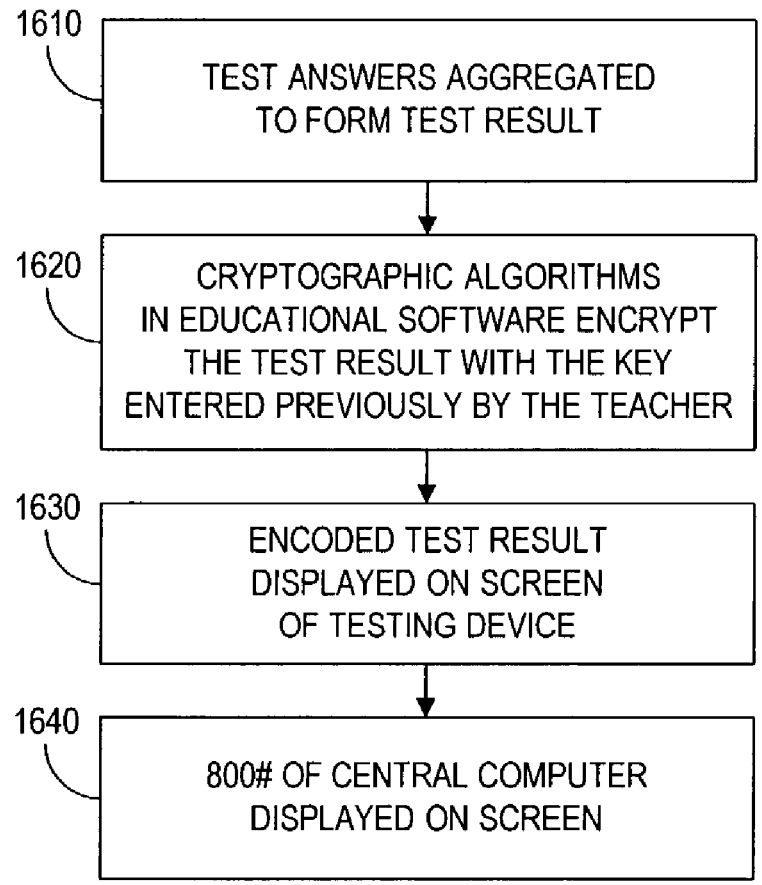
FIG. 16 illustrates an exemplary process for test result encoding in a home testing application.

Referring now to FIG. 16, there is shown an exemplary embodiment for the process of encoding the test results for transmission to the central computer 300. At step 1610, the test-taker's answers are aggregated into a test result, which is encrypted at step 1620 using the key entered into the test disk at the time the disk was generated. At step 1630, the encoded test result 1100 is displayed on the video monitor 150 of the testing computer 200. At step 1640, the 800 number of the central computer 300 is similarly displayed.

Figure 17:
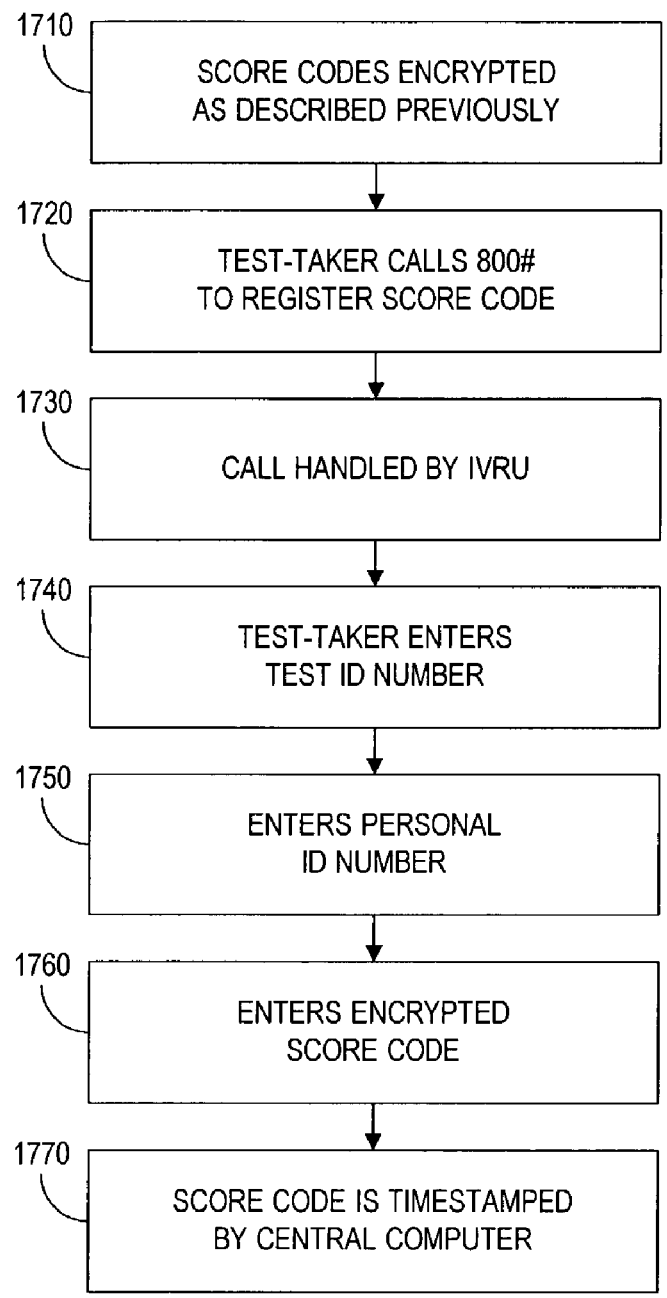
FIG. 17 illustrates an exemplary process for transmitting encoded test results to the central computer in a home testing application.

Referring now to FIG. 17, there is shown an exemplary embodiment of a process for transmitting the encoded test results 1100 to the central computer 300. At step 1720, the test-taker calls the 800 number to register his test results with the central computer 300. At step 1730, the IVRU 370 prompts the test-taker who, at step 1740, enters the test ID number. At step 1750, the test-taker enters his personal ID number and, at step 1760, enters the encoded test result 1100. This result is timestamped by the central computer 300 at step 1770 so that it can be checked later for compliance with the established end time of the test.

Figure 18:
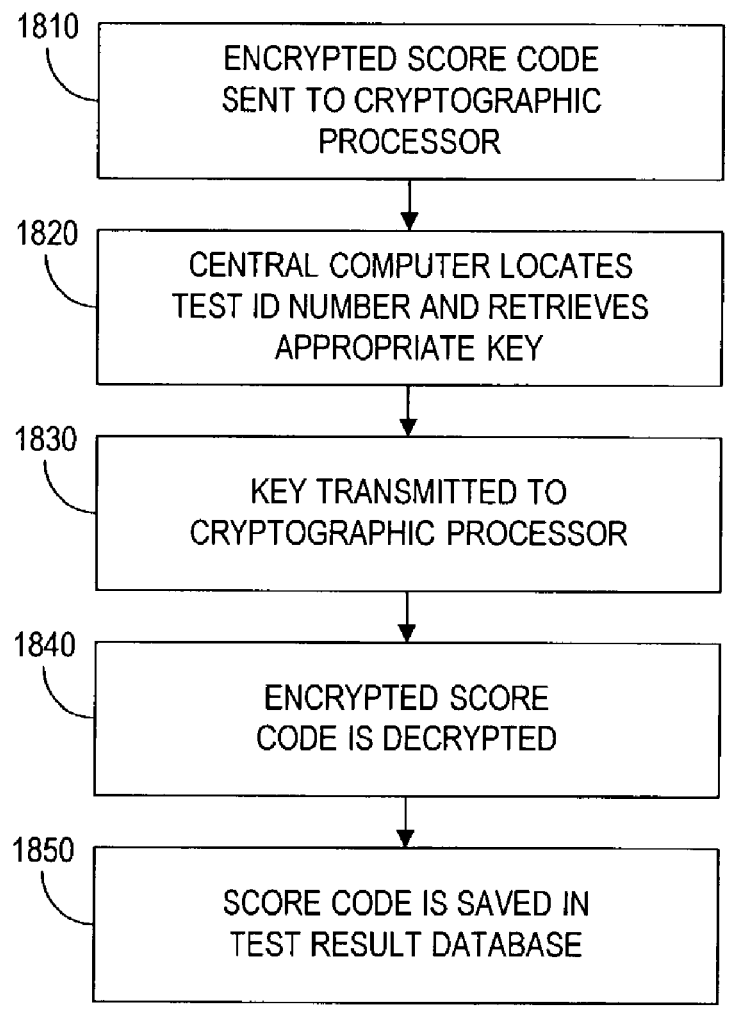
FIG. 18 illustrates an exemplary process for decoding and scoring a received encoded test result at the central computer in a home testing application.

Referring now to FIG. 18, there is shown an exemplary embodiment of a process for decoding the encoded test result 1100 within central computer 300. At step 1810, the encoded test result 1100 is sent to the cryptographic processor 320. At step 1820, the central computer 300 looks up the test ID number to find the cryptographic key used to encrypt the test result. This key is transmitted at step 1830 to the cryptographic processor 320 where, at step 1840, the encoded test result 1100 is decrypted and scored. The answer key used for scoring could have been previously transmitted from the teacher to the central computer during the test registration process at step 1470 in FIG. 14. At step 1850, the scored test result 1100 is saved in the test result database 390.

Figure 19:
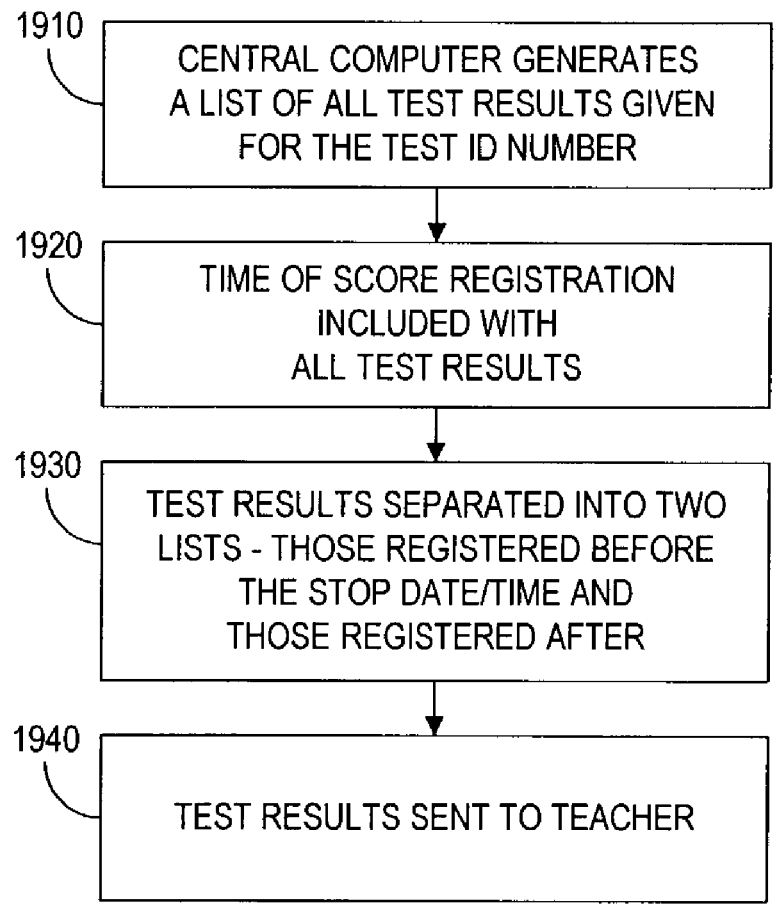
FIG. 19 illustrates an exemplary process for transmitting the scored test results to a teacher in a home testing application.

Referring now to FIG. 19, there is shown an exemplary embodiment of a process for transmitting the scored test results back to the teacher who generated the test. At step 1910, the central computer 300 generates a list of all scores for the given test ID number. Along with these scores, at step 1920, are the timestamps associated with each score. At step 1930, the scores are separated into two lists—those with timestamps before the stop time, and those with timestamps after the stop time. At step 1940, these scores are sent to the teacher. Scores whose timestamps exceed the pre-established end time for the test may be rejected or penalized in an appropriate manner.

In the above embodiment, the testing computer 200 transmits unscored test answers to the central computer 300 for scoring at the central computer 300. In a variation of the above embodiment, the encoded test results could be scored by the testing computer 200 before being transmitted to the central computer 300. This requires that an answer key be available to the testing computer 200 along with the test questions. This answer key may have been provided in encrypted form, along with the test questions, on the disk created by the teacher's test generator software and provided to the student prior to testing.

5) Distributed Computing

In another embodiment of the invention, the testing software could be programmed in a distributed computing language such as Sun's Java, that allows both the functional (testing algorithms) and non-functional (test content) aspects of the testing software to be integrated into "executable content" accessible from a remote server over the World Wide Web. Even more sophisticated distributed computing protocols allow the processing of information by different computers operating in a networked environment. Allowing the central computer 300 (or any other networked computer) to perform portions of the computational processing that would otherwise be performed by the testing computer 200 greatly reduces the cost of the testing computer 200, making it more affordable to a wider market. For example, rather than locally scoring the test questions, the testing computer 200 could upload the encoded, unscored answers to a networked computer for remote scoring.

In a similar manner, while the above embodiments describe a single computer acting as the central computer 300, those skilled in the art will realize that the functionality of the central computer 300 can be realized among a plurality of computers. Thus, in an alternative embodiment of the invention, the central computer 300 may be configured as a distributed architecture wherein the databases and cryptographic processors are housed in physically separate units. In such a configuration, each unit is in communication with its constituent parts, but the processor and/or data storage functions are performed by stand-alone units. This arrangement can yield a more dynamic and flexible system which is less prone to catastrophic hardware failures affecting the entire system.

6) Messages

In accordance with an embodiment of the invention, various information may be presented to the user in any of a number of ways and upon any of a number of events or conditions. For example, various messages may be displayed which relate to the testing process, or to the test results themselves. For example, a congratulatory message may be displayed if the user successfully answers five questions in a row. As another example, a particular message may be output if a predetermined amount of time has passed with no activity by the user.

Messages may also relate to other users and/or their testing process. For example, an informational message may be output if any of a number of particular users achieve a certain score, or the highest score of the group.

Messages may, but need not, be output immediately after the condition or event which prompts their outputting. For example, messages may only be output after a testing sessions has been completed.

Messages may be configured to be output at certain periods of time. For example, parents of a test taker may establish periodic reminders to remind the test taker to take another test, to remind the test taker what the reward is, to remind the test taker how close he is to earning the reward.

For purposes of illustration only, and not to limit generality, the present invention has been explained with reference to various embodiment, including examples of time sources, cryptographic operations, output devices, and sensors. However, one skilled in the art will appreciate that the invention is not limited to the particular illustrated embodiments or applications, but includes many others that operate in accordance with the principles disclosed herein.

What is claimed is:

1. A method comprising:
   receiving, by a computer, a selection of at least one reward chosen by an individual from a website;
   receiving an indication of a reward threshold;
   administering a test to the individual;
   determining a test result based on the test; and
   determining a proximity to the reward threshold based on the test result.

2. The method of claim 1, further comprising:
   outputting a message to the individual that indicates the proximity to the reward threshold.

3. The method of claim 2, in which outputting comprises:
   outputting the message via a telephone.

4. The method of claim 2, in which outputting comprises:
   outputting the message via a game machine.

5. The method of claim 2, in which outputting comprises:
   outputting the message via a toy.

6. The method of claim 1, in which the reward threshold is associated with the reward.

7. The method of claim 1, in which the reward threshold comprises a condition to be satisfied in order for the individual to earn the reward.

8. The method of claim 1, in which the at least one reward comprises a product.

9. The method of claim 1, in which the at least one reward comprises a code.

10. The method of claim 1, in which the at least one reward comprises a code that activates functionality of software.

11. The method of claim 1, in which the at least one reward comprises a code that permits access to content.

12. The method of claim 1, further comprising, prior to receiving a selection, displaying a plurality of products on the website.

13. The method of claim 1, in which the reward threshold comprises a score.

14. The method of claim 1, in which the reward threshold is associated with an improvement in at least one measure of performance.

15. The method of claim 1, in which the reward threshold is associated with a minimum increase in a measure of performance.

16. The method of claim 1, in which the reward threshold is associated with an average performance of a plurality of test-takers.

17. The method of claim 1, in which the reward threshold is associated with a percentile of a plurality of test-takers.

18. The method of claim 1, in which the reward threshold is associated with a number of correct answers.

19. The method of claim 1, in which the reward threshold is associated with a predetermined score increase.

20. The method of claim 1, in which administering comprises:
    providing at least one question to the individual via a toy.

21. The method of claim 1, in which determining the proximity comprises:
    comparing the reward threshold to the test result.

22. The method of claim 1, further comprising:
    determining a second test result that is associated with a second individual, and in which determining the proximity to the reward threshold based on the test result comprises:
    comparing the test result to the second test result.

23. The method of claim 1, further comprising:
    determining that the individual has earned a reward based on the test result and the reward threshold.

24. The method of claim 23, further comprising:
    transmitting a message indicating that the individual has earned the reward.

25. A computer readable medium storing instructions configured to direct a processor to:
    receive a selection of at least one reward chosen by an individual from a website;
    receive an indication of a reward threshold;
    administer a test to the individual;
    determine a test result based on the test; and
    determine a proximity to the reward threshold based on the test result.

26. The computer readable medium of claim 25, further comprising instructions configured to direct the processor to output a message to the individual that indicates the proximity to the reward threshold.

27. The computer readable medium of claim 26, in which the instructions for outputting the message comprise instructions configured to direct the processor to output the message via a telephone.

28. The computer readable medium of claim 26, in which the instructions for outputting the message comprise instructions configured to direct the processor to output the message via a game machine.

29. The computer readable medium of claim 26, in which the instructions for outputting the message comprise instructions configured to direct the processor to output the message via a toy.

30. The computer readable medium of claim 25, in which the instructions for receiving an indication of the reward threshold comprise instructions configured to direct the processor to associate the reward threshold with the reward.

31. The computer readable medium of claim 25, in which the instructions for receiving an indication of the reward threshold comprise instructions configured to direct the processor to receive a condition to be satisfied in order for the individual to earn the reward.

32. The computer readable medium of claim 25, in which the instructions for receiving a selection of at least one reward comprise instructions configured to direct the processor to receive an indication of the selection of a product.

33. The computer readable medium of claim 25, in which the instructions for receiving a selection of at least one reward comprise instructions configured to direct the processor to receive an indication of the selection of a code.

34. The computer readable medium of claim 25, further comprising instructions configured to direct the processor to, prior to receiving a selection, display a plurality of products on the website.

35. The computer readable medium of claim 25, in which the instructions for receiving an indication of the reward threshold comprise instructions configured to direct the processor to receive a score.

36. The computer readable medium of claim 25, in which the instructions for receiving an indication of the reward threshold comprise instructions configured to direct the processor to associate the reward threshold with an improvement in at least one measure of performance.

37. The computer readable medium of claim 25, in which the instructions for receiving an indication of the reward threshold comprise instructions configured to direct the processor to associate the reward threshold with a minimum increase in a measure of performance.

38. The computer readable medium of claim 25, in which the instructions for receiving an indication of the reward threshold comprise instructions configured to direct the processor to associate the reward threshold with an average performance of a plurality of test-takers.

39. The computer readable medium of claim 25, in which the instructions for receiving an indication of the reward threshold comprise instructions configured to direct the processor to associate the reward threshold with a percentile of a plurality of test-takers.

40. The computer readable medium of claim 25, in which the instructions for receiving an indication of the reward threshold comprise instructions configured to direct the processor to associate the reward threshold with a number of correct answers.

41. The computer readable medium of claim 25, in which the instructions for receiving an indication of the reward threshold comprise instructions configured to direct the processor to associate the reward threshold with a predetermined score increase.

42. The computer readable medium of claim 25, in which the instructions for administering the test comprise instructions configured to direct the processor to provide at least one question to the individual via a toy.

43. The computer readable medium of claim 25, in which the instructions for determining the proximity to the reward threshold comprise instructions configured to direct the processor to compare the reward threshold to the test result.

44. The computer readable medium of claim 25, further comprising instructions configured to direct the processor to:
  determine a second test result that is associated with a second individual; and
  in which the instructions for determining the proximity to the reward threshold based on the test result comprises instructions configured to direct the processor to compare the test result to the second test result.

45. The computer readable medium of claim 25, further comprising instructions configured to direct the processor to determine that the individual has earned a reward based on the test result and the reward threshold.

46. The computer readable medium of claim 45, further comprising instructions configured to direct the processor to transmit a message indicating that the individual has earned the reward.

47. An apparatus, comprising:
  a processor; and
  a data storage device storing instructions configured to direct the processor to:
    receive a selection of at least one reward chosen by an individual from a website;
    receive an indication of a reward threshold;
    administer a test to the individual;
    determine a test result based on the test; and
    determine a proximity to the reward threshold based on the test result.

* * * * *